(12) United States Patent
Matsuyama et al.

(10) Patent No.: US 10,518,341 B2
(45) Date of Patent: *Dec. 31, 2019

(54) CUTTING METHOD FOR FIBER REINFORCED COMPOSITE MATERIAL

(71) Applicant: MITSUBISHI GAS CHEMICAL COMPANY, INC., Tokyo (JP)

(72) Inventors: Yousuke Matsuyama, Yamagata (JP); Shigeru Horie, Tokyo (JP); Kenji Ishikura, Yamagata (JP); Yoshihiro Kato, Yamagata (JP); Kazuhiro Nakamura, Yamagata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/754,418

(22) PCT Filed: Nov. 25, 2016

(86) PCT No.: PCT/JP2016/084918
§ 371 (c)(1),
(2) Date: Feb. 22, 2018

(87) PCT Pub. No.: WO2017/090711
PCT Pub. Date: Jun. 1, 2017

(65) Prior Publication Data
US 2018/0243846 A1    Aug. 30, 2018

(30) Foreign Application Priority Data

Jun. 15, 2016   (JP) ................... 2016-118726

(51) Int. Cl.
*B23Q 11/10*   (2006.01)
*B23C 5/28*   (2006.01)
(Continued)

(52) U.S. Cl.
CPC .............. *B23C 5/28* (2013.01); *B23C 3/28* (2013.01); *B23Q 11/10* (2013.01);
(Continued)

(58) Field of Classification Search
CPC ......... B23C 3/28; B23C 5/28; B23C 2250/12; B23Q 11/10; B23Q 11/046;
(Continued)

(56) References Cited

U.S. PATENT DOCUMENTS 4,052,323 A    10/1977 Feneberger et al.
4,519,732 A *   5/1985 Sutcliffe ................ B23B 35/00
                                                   264/155
(Continued)

FOREIGN PATENT DOCUMENTS

CN    105073355 A    11/2015
DE    3531786 A1 *    3/1987 ............... B23C 5/10
(Continued)

OTHER PUBLICATIONS

Description JP2008222762 obtained at https://worldwide.espacenet.com/ (last visited Oct. 18, 2018).*
(Continued)

*Primary Examiner* — Ryan C Rufo
(74) *Attorney, Agent, or Firm* — Greenblum & Bernstein, P.L.C.

(57)    ABSTRACT

The present invention provides a cutting method comprising a cutting step of cutting a workpiece material with a cutting tool to thereby form a through-groove in the workpiece material, wherein in the cutting step, the through-groove is formed in the workpiece material by cutting the workpiece material with the cutting tool while contacting a cut-assisting lubricant with the contact portion of the cutting tool with the workpiece material and/or the contact portion of the (Continued)

workpiece material with the cutting tool, and the workpiece material comprises a fiber reinforced composite material.

20 Claims, 1 Drawing Sheet

(51) Int. Cl.
| | |
|---|---|
| *B23C 3/28* | (2006.01) |
| *C10M 103/02* | (2006.01) |
| *C10M 105/40* | (2006.01) |
| *C10M 125/02* | (2006.01) |
| *C10M 129/70* | (2006.01) |
| *C10M 145/04* | (2006.01) |

(52) U.S. Cl.
CPC ........ *C10M 103/02* (2013.01); *C10M 105/40* (2013.01); *C10M 125/02* (2013.01); *C10M 129/70* (2013.01); *C10M 145/04* (2013.01); *B23C 2226/27* (2013.01); *B23C 2250/12* (2013.01); *C10M 2201/041* (2013.01); *C10M 2201/0413* (2013.01); *C10M 2207/281* (2013.01); *C10M 2207/2815* (2013.01); *C10M 2209/104* (2013.01); *C10M 2209/1045* (2013.01); *C10N 2240/401* (2013.01); *C10N 2250/08* (2013.01)

(58) Field of Classification Search
CPC .......... C10M 103/02; C10M 107/12;
C10M 107/24; C10M 107/32; C10M 107/34; C10M 107/26; C10M 125/02; C10M 107/28; C10M 111/04; C10M 2201/041; C10N 2020/06; C10N 2020/04; C10N 2030/16; C10N 2030/18; C10N 2040/20
USPC ................................. 508/579, 501
See application file for complete search history.

(56) References Cited

U.S. PATENT DOCUMENTS

| | | | | |
|---|---|---|---|---|
| 4,572,714 | A | | 2/1986 | Suzuki et al. |
| 4,990,035 | A | * | 2/1991 | Scheuch ............... B23C 5/10 407/29.13 |
| 5,082,402 | A | * | 1/1992 | Gaku ............... H05K 3/0047 408/1 R |
| 5,507,603 | A | * | 4/1996 | Nakano ............... B23Q 11/10 408/1 R |
| 5,816,755 | A | * | 10/1998 | Thelin ............... B23C 3/00 409/132 |
| 6,164,876 | A | * | 12/2000 | Cordovano ............... B23C 5/10 407/59 |
| 2002/0051684 | A1 | * | 5/2002 | Eziri ............... B23Q 11/10 408/1 R |
| 2002/0170178 | A1 | * | 11/2002 | Zackrisson ............ B23B 51/10 30/34.1 |
| 2003/0100456 | A1 | | 5/2003 | Hasaki et al. |
| 2003/0152432 | A1 | * | 8/2003 | Meece ............... B23C 3/00 409/132 |
| 2004/0023059 | A1 | * | 2/2004 | Kaburagi ............. B23B 35/005 428/650 |
| 2004/0191016 | A1 | * | 9/2004 | Hintze ................ B23B 49/008 408/67 |
| 2005/0123363 | A1 | * | 6/2005 | Ahrnkiel ............... B23C 5/10 407/53 |
| 2007/0127997 | A1 | * | 6/2007 | Muselli ............... B23B 31/36 409/132 |
| 2008/0170917 | A1 | * | 7/2008 | Hilker ............... B23C 5/1054 407/54 |
| 2010/0054871 | A1 | * | 3/2010 | Prakash ............... C22C 29/005 407/11 |
| 2010/0172708 | A1 | * | 7/2010 | Bolin ............... B23C 5/003 409/131 |
| 2012/0020749 | A1 | * | 1/2012 | Maeda ............... B23C 5/003 407/42 |
| 2012/0039680 | A1 | * | 2/2012 | Koike ............... B23B 51/02 408/1 R |
| 2012/0051863 | A1 | * | 3/2012 | Craig ............... B23B 51/08 408/1 R |
| 2012/0219371 | A1 | * | 8/2012 | Craig ............... B23C 3/02 408/1 R |
| 2012/0282044 | A1 | * | 11/2012 | Volokh ............... B23C 5/10 407/53 |
| 2012/0294689 | A1 | * | 11/2012 | Yagista ............... B23B 51/0036 409/200 |
| 2013/0017025 | A1 | * | 1/2013 | Azegami ............... B23C 5/10 407/54 |
| 2013/0020735 | A1 | * | 1/2013 | Hintze ............... B23C 3/00 264/162 |
| 2013/0170920 | A1 | * | 7/2013 | Ogawa ............... B23B 51/02 408/1 R |
| 2013/0209184 | A1 | * | 8/2013 | Barry ............... B23C 5/10 407/54 |
| 2013/0209190 | A1 | * | 8/2013 | Oode ............... B23C 9/00 409/137 |
| 2014/0260884 | A1 | * | 9/2014 | Hsieh ............... B26D 3/065 83/875 |
| 2016/0045961 | A1 | | 2/2016 | Umehara et al. |
| 2017/0009171 | A1 | * | 1/2017 | Soto-Castillo ....... C10M 125/22 |
| 2017/0100781 | A1 | * | 4/2017 | Zhang ............... B23B 29/125 |
| 2017/0106606 | A1 | * | 4/2017 | Toyozumi ............... B23C 3/00 |
| 2017/0274461 | A1 | * | 9/2017 | Mabuchi ............... B23B 51/02 |

FOREIGN PATENT DOCUMENTS

| | | | | |
|---|---|---|---|---|
| EP | 0571352 | A2 | * 11/1993 | ............ B23C 3/00 |
| EP | 2979832 | A1 | 3/2014 | |
| JP | 57-107718 | A | 7/1982 | |
| JP | 2001047307 | A | * 2/2001 | |
| JP | 2003-175412 | A | 6/2003 | |
| JP | 2006181657 | A | * 7/2006 | |
| JP | 2008-222762 | A | 9/2008 | |
| JP | 2008-222762 | A2 | 9/2008 | |
| JP | 2011-20248 | A | 2/2011 | |
| JP | 2011-020248 | A3 | 2/2011 | |
| JP | 2012-210689 | A | 11/2012 | |
| JP | 2015-160275 | A | 9/2015 | |
| JP | 2015-160275 | A4 | 9/2015 | |
| SG | 11201506893 | U | 9/2015 | |
| SG | 11201710736X | | 1/2018 | |
| WO | 2014-157570 | A1 | 10/2014 | |
| WO | 2014/157570 | A1 | 10/2014 | |

OTHER PUBLICATIONS

Description DE3531786 (translation) obtained at https://worldwide.espacenet.com/ (last visited Jun. 18, 2019).*
Korean Intellectual Property Office Decision to Grant a Patent in Application No. 10-2018-7007756 dated Apr. 10, 2018.
Allowed Claims in Korean Application No. 10-2018-7007756, English translation thereof, and executed verification statement of translation.
International Search Report with English Translation from Patent Application No. PCT/JP2016/084918, dated Feb. 14, 2017.

* cited by examiner

[Figure 1]
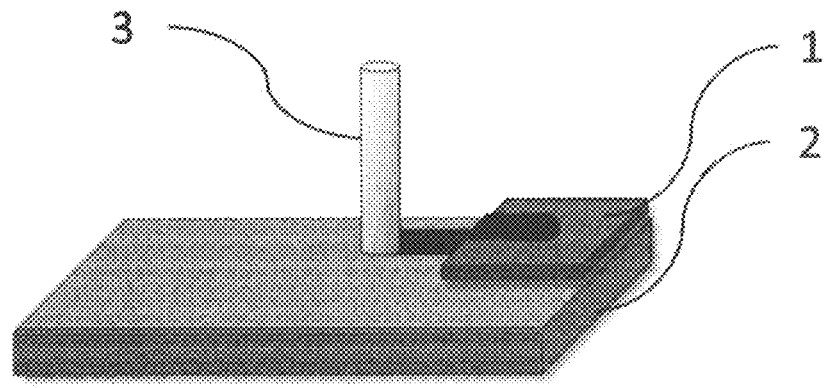
[Figure 2]
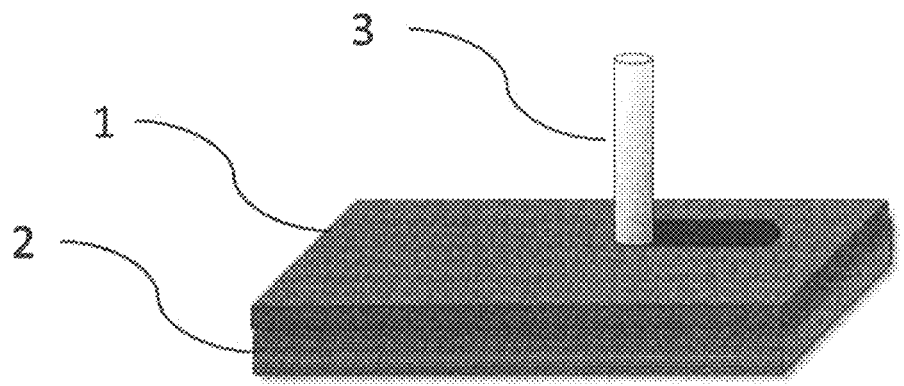
[Figure 3]
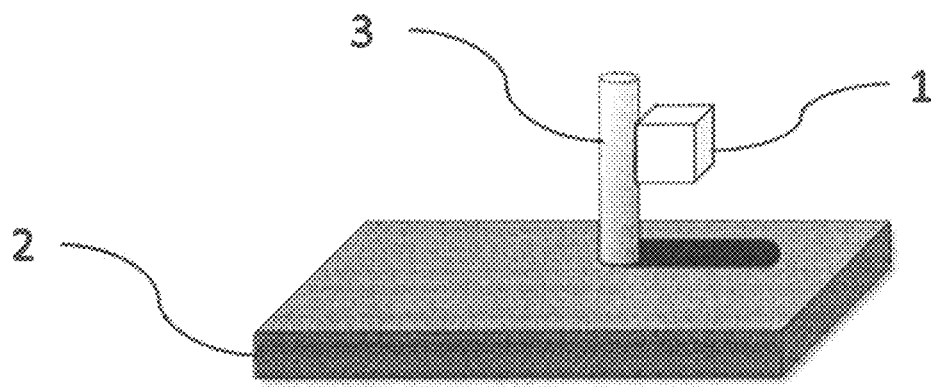

CUTTING METHOD FOR FIBER REINFORCED COMPOSITE MATERIAL

TECHNICAL FIELD

The present invention relates to a cutting method for a fiber reinforced composite material.

BACKGROUND ART

Fiber reinforced composite materials typified by fiber reinforced plastics (FRP), in particular, carbon fiber reinforced plastics (CFRP), have large tensile strength and tensile elastic force and small density, as compared with glass fiber reinforced plastics (GFRP), aramid fiber reinforced plastics (AFRP), or stainless steel (SUS), and have therefore tended to be frequently used as outer panels or the like of aircrafts or vehicles in recent years. In this context, CFRP refers to plastics prepared by hot molding or hot press molding one or two or more layers of prepregs containing carbon fiber impregnated with a matrix resin. A member formed from this CFRP is fixed to a structure using a fastening factor such as a bolt or a rivet. Therefore, cutting work, in particular, cutting work to make many holes for passing a fastening factor in CFRP, is necessary for fixing CFRP to a structure such as an aircraft part.

Some techniques have already been proposed in order to obtain high quality holes by the cutting work of CFRP. Examples of such a technique include a method which involves gradually changing the shape of a tool, for example, the curvature of a cutting face or the point angle of a drill (see, for example, Patent Literature 1).

CITATION LIST

Patent Literature

Patent Literature 1: Japanese Patent Laid-Open No. 2012-210689

SUMMARY OF INVENTION

Technical Problem

Cutting work, such as the drilling of fiber reinforced composite materials, is typically performed using a drill. In the general drilling with a drill, the drill has an exceedingly short lifespan, and the drill bit suffers abrasion with increase in the number of processed holes, resulting in reduction in the quality of processed holes. Specifically, the processed holes are more likely to have a small inside diameter, and the fluffing of carbon fiber (hereinafter, also referred to as "splintering"; which is a phenomenon in which a part of fiber constituting a fiber reinforced composite material remains as burrs around processed holes without being cut off) occurs easily at the exit portion of drill penetration. Furthermore, peeling between layers of prepregs constituting a fiber reinforced composite material (hereinafter, also referred to as "delamination") also occurs easily. In addition, each processed hole has a nonuniform inside diameter due to the abrasion of a drill bit, and delamination may occur from the irregularity of the processed hole. Such a phenomenon is accepted as a serious defect. As mentioned above, the abrasion of a drill bit is likely to cause problems associated with the quality of processed holes. Meanwhile, for example, the production of structures using CFRP for aircrafts particularly requires high quality cutting work. Thus, it is very important to solve the problems described above, such as fluffing and delamination.

In the cutting work of CFRP among fiber reinforced composite materials, the problems associated with the quality of processed holes arise more easily as the abrasion of a cutting tool proceeds with cutting resistance increased. Particularly, for example, high strength CFRP intended for aircrafts contains carbon fiber at a high density. Therefore, the frequency of rubbing of carbon fiber by a drill is increased so that the abrasion of the cutting tool proceeds more rapidly. As measures against this, the tool is changed at shorter intervals in order to maintain hole quality. Under present circumstances, the ratio of tooling cost to processing cost is high.

In this respect, as described in Patent Literature 1, improvement in the workability of fiber reinforced composite materials (e.g., CFRP), for which cutting work is difficult, has been studied in terms of tools, but has produced insufficient effects.

Particularly, conventional processing methods in fiber reinforced composite material processing with a long cutting distance, such as through-groove formation, are more likely to cause the abrasion of a cutting tool with increase in cutting distance, as compared with fiber reinforced composite material processing with a short cutting distance, such as drilling work. Unfortunately, this facilitates causing burrs, chippings, or splintering at the entrance portion or the exit portion of cutting tool penetration (hereinafter, these portions are also collectively referred to as the "periphery of a cut portion"). There also arises the problem that change in the dimension of a cutting tool caused by abrasion narrows a formed through-groove width. This is because a longer cutting distance increases the volume of a fiber reinforced composite material to be removed by cutting work and increases load to a cutting tool.

The present invention has been made in light of the problems described above, and an object of the present invention is to provide a cutting method for a fiber reinforced composite material which can reduce load to a cutting tool in the cutting work of a workpiece material, particularly, the cutting work of a fiber reinforced composite material (difficult-to-cut material) to form a through-groove, can thereby reduce the occurrence of burrs, chippings, or splintering at the periphery of a cut portion, and can reduce the narrowing of a through-groove width.

Solution to Problem

The present inventors nave conducted diligent studies to attain the object. As a result, the present inventors have completed the present invention by finding that the object can be attained by contacting in advance a cut-assisting lubricant with a cutting tool and/or a workpiece material during the cutting of the workpiece material with the cutting tool.

Specifically, the present invention is as follows:

[1]

A cutting method comprising a cutting step of cutting a workpiece material with a cutting tool to thereby form a through-groove in the workpiece material, wherein in the cutting step, the through-groove is formed in the workpiece material by cutting the workpiece material with the cutting tool while contacting a cut-assisting lubricant with the contact portion of the cutting tool with the workpiece material and/or the contact portion of the workpiece material with the cutting tool, and the workpiece material comprises a fiber reinforced composite material.

[2]
The cutting method according to [1], wherein the cutting step comprises the steps of: cutting the workpiece material with the cutting tool to thereby form a through-hole in the workpiece material; and forming the through-groove in the workpiece material by cutting the workpiece material while moving the cutting tool inserted in the through-hole in a direction orthogonal or substantially orthogonal to the penetration direction of the through-hole.

[3]
The cutting method according to [1] or [2], wherein the cutting method comprises a close contact step of closely contacting in advance the cut-assisting lubricant with a portion to serve as a starting point for forming the through-groove.

[4]
The cutting method according to any one of [1] to [3], wherein the cutting method comprises a close contact step of closely contacting in advance the cut-assisting lubricant with the whole surface of a region where the through-groove is to be formed.

[5]
The cutting method according to any of [1] to [4], wherein the cutting tool is a router bit.

[6]
The cutting method according to any of [1] to [5], wherein
the cut-assisting lubricant contains
a high molecular weight compound (A) having a weight average molecular weight of $5.0 \times 10^4$ or higher and $1.0 \times 10^6$ or lower,
a medium molecular weight compound (B) having a weight average molecular weight of $1.0 \times 10^3$ or higher and lower than $5.0 \times 10^4$, and
a carbon (C) having an average particle size of 100 μm or larger.

[7]
The cutting method according to [6], wherein
the shape of the carbon (C) is a flake shape.

[8]
The cutting method according to [6] or [7], wherein
the high molecular weight compound (A) comprises a thermoplastic resin having a weight average molecular weight of $5.0 \times 10^4$ or higher and $1.0 \times 10^6$ or lower, and
the medium molecular weight compound (B) comprises a thermoplastic resin having a weight average molecular weight of $1.0 \times 10^3$ or higher and $2.0 \times 10^4$ or lower.

[9]
The cutting method according to any of [6] to [8], wherein
the high molecular weight compound (A) comprises a water soluble thermoplastic resin and/or a non-water soluble thermoplastic resin, wherein
the water soluble thermoplastic resin is one or more resins selected from the group consisting of a polyalkylene oxide compound, a polyalkylene glycol compound, an ester compound of polyalkylene glycol, an ether compound of polyalkylene glycol, a monostearate compound of polyalkylene glycol, a water soluble urethane, a water soluble polyether resin, a water soluble polyester, sodium poly(meth)acrylate, polyacrylamide, polyvinylpyrrolidone, polyvinyl alcohol, saccharides, and modified polyamide, and
the non-water soluble thermoplastic resin is one or more resins selected from the group consisting of a urethane polymer, an acrylic polymer, a vinyl acetate polymer, a vinyl chloride polymer, a polyester polymer, a polystyrene resin, and a copolymer thereof.

[10]
The cutting method according to any of [6] to [9], wherein
the medium molecular weight compound (B) is one or more compounds selected from the group consisting of a polyalkylene glycol compound, a monoether compound of polyalkylene oxide, a monostearate compound of polyalkylene oxide, and a polyalkylene oxide compound.

[11]
The cutting method according to any of [6] to [10], wherein
in the cut-assisting lubricant,
the content of the high molecular weight compound (A) is 20 to 60 parts by mass with respect to 100 parts by mass in total of the high molecular weight compound (A), the medium molecular weight compound (b), and the carbon (C),
the content of the medium molecular weight compound (B) is 10 to 75 parts by mass with respect to 100 parts by mass in total of the nigh molecular weight compound (A), the medium molecular weight compound (B), and the carbon (C), and
the content of the carbon (C) is 5 to 70 parts by mass with respect to 100 parts by mass in total of the high molecular weight compound (A), the medium molecular weight compound (B), and the carbon (C).

[12]
The cutting method according to any of [1] to [11], wherein
the cut-assisting lubricant is in the form of a sheet having a thickness of 0.1 mm or larger.

[13]
The cutting method according to any of [1] to [12], wherein
when the cut-assisting lubricant is removed from the workpiece material after the cutting work, the amount of a component of the cut-assisting lubricant attached to the workpiece material is $1.0 \times 10^{-8}$ g or smaller per $mm^2$ of the areas of the contact portion between the workpiece material and the cut-assisting lubricant, and the processed portion.

[14]
The cutting method according to any of [1] to [13], wherein
the cut-assisting lubricant has an adhesive layer on a face to be contacted with the workpiece material.

[15]
The cutting method according to [14], wherein
the adhesive layer comprises an acrylic polymer.

[16]
The cutting method according to [14] or [15], wherein
when the cut-assisting lubricant is removed from the workpiece material after the cutting work, the amount of a component of the cut-assisting lubricant and/or the adhesive layer attached to the workpiece material is $1.0 \times 10^{-3}$ g or smaller per $mm^2$ of the areas of the contact portion between the workpiece material and the cut-assisting lubricant, and the processed portion.

[17]
The cutting method according to any of [1] to [16], wherein
the fiber reinforced composite material is a carbon fiber reinforced plastic.

Advantageous Effects of Invention

The present invention can provide a cutting method for a fiber reinforced composite material which can reduce load to a cutting tool in the cutting work of a workpiece material, particularly, the cutting work of a fiber reinforced composite material (difficult-to-cut material) to form a through-groove, can thereby reduce the occurrence of burrs, chippings, or splintering at the periphery of a cut portion, and can reduce the narrowing of a through-groove width.

BRIEF DESCRIPTION OF DRAWINGS

FIG. 1 is a schematic diagram illustrating one embodiment of the cutting method of the present embodiment.

FIG. 2 is a schematic diagram illustrating another embodiment of the cutting method of the present embodiment.

FIG. 3 is a schematic diagram showing one example of a state where a cut-assisting lubricant is contacted with and attached to a cutting tool in the cutting method of the present embodiment.

DESCRIPTION OF EMBODIMENTS

Hereinafter, the mode for carrying out the present invention (hereinafter, referred to as the "present embodiment") will be described in detail. However, the present invention is not intended to be limited by the present embodiment, and various changes or modifications can be made without departing from the spirit of the present invention.

[Cutting Method]

The cutting method of the present embodiment is a cutting method comprising a cutting step of cutting a workpiece material with a cutting tool to thereby form a through-hole in the workpiece material, wherein in the cutting step, the through-groove is formed in the workpiece material by cutting the workpiece material with the cutting tool while contacting a cut-assisting lubricant with the contact portion of the cutting tool with the workpiece material and/or the contact portion (including a to-be-processed portion) of the workpiece material with the cutting tool, and the workpiece material comprises a fiber reinforced composite material. In this context, the "through-groove" described in the present specification is a groove that penetrates a workpiece material and is also called a through-hole groove. Examples of this through-groove include a groove formed by processing using a router bit as a cutting tool (also referred to as router processing).

FIGS. 1 to 3 show schematic diagrams illustrating one embodiment of the cutting method of the present embodiment. FIGS. 1 to 3 show a state after formation of a through-groove by the cutting method. A cut-assisting lubricant 1 is used in the cutting work of a workpiece material 2 (particularly, a difficult-to-cut material). Specifically, the cut-assisting lubricant 1 is placed on a portion to serve as the exit of a cutting tool and/or a portion to serve as the entrance of a cutting tool, in the workpiece material 2, and the workpiece material 2 is processed using a cutting tool 3. More specifically, in one embodiment, the cut-assisting lubricant 1 in the form of a sheet is placed in contact with a partial surface of the workpiece material 2 in the form of a sheet at a stage prior to that shown in FIG. 1. Nest, the cut-assisting lubricant 1 and the workpiece material 2 are cut in their lamination direction (i.e., penetration direction; the same holds true for the description below) such that the cutting tool 3 penetrates the cut-assisting lubricant 1 and the workpiece material 2 from the surface of the cut-assisting lubricant 1, to form a through-hole (through-hole formation step). Next, the workpiece material 2 is subsequently cut by moving the cutting tool 3 in a direction orthogonal or substantially orthogonal to the lamination direction of the cut-assisting lubricant 1 and the workpiece material 2, to form a through-groove as shown in FIG. 1 (through-groove formation step). In this embodiment, the cut-assisting lubricant 1 is contacted in advance with the cutting tool 3 so that a part of the cut-assisting lubricant 1 is attached to the surface of the cutting tool 3, followed by cutting. Therefore, the cutting is performed in a state where the cut-assisting lubricant 1 is contacted with the contact portion of the cutting tool 3 with the workpiece material 2. Even in the process of cutting, a lubricating component of the cut-assisting lubricant 1 contacted with the cutting tool 3 is melted and runs off the surface of the cutting tool 3. Therefore, the lubricating component of the cut-assisting lubricant 1 is subsequently supplied to the contact portion of the cutting tool 3 with the workpiece material 2. In the present specification, the "lubricating component" is a component constituting a lubricant and is a component that is effective for reducing the force of friction generated upon contact between solid substances such as the cutting edge of a tool and a workpiece material. Specific examples of the lubricating component include a solid lubricant graphite and thermoplastic resins polyethylene oxide and polyethylene glycol.

In another embodiment, the cut-assisting lubricant 1 in the form of a sheet is placed in contact with the whole of one surface of the workpiece material 2 in the form of a sheet at a stage prior to that shown in FIG. 2. Next, the cut-assisting lubricant 1 and the workpiece material 2 are cut in their lamination direction such that the cutting tool 3 penetrates the cut-assisting lubricant 1 and the workpiece material 2 from the surface of the cut-assisting lubricant 1, to form a through-hole (through-hole formation step). Next, the workpiece material 2 is subsequently cut by moving the cutting tool 3 in a direction orthogonal or substantially orthogonal to the lamination direction of the cut-assisting lubricant 1 and the workpiece material 2, to form a through-groove as shown in FIG. 2 (through-groove formation step). In this embodiment as well, the cut-assisting lubricant 1 is contacted in advance with the cutting tool 3 so that a part of the cut-assisting lubricant 1 is attached to the surface of the cutting tool 3, followed by cutting. Therefore, the cutting is performed in a state where the cut-assisting lubricant 1 is contacted with the contact portion of the cutting tool 3 with the workpiece material 2. Even in the process of cutting, a lubricating component of the cut-assisting lubricant 1 contacted with the cutting tool 3 is melted and runs off the surface of the cutting tool 3. Therefore, the lubricating component of the cut-assisting lubricant 1 is subsequently supplied to the contact portion of the cutting tool 3 with the workpiece material 2. In this embodiment, the cut-assisting lubricant 1 is placed throughout one surface of the workpiece material 2 so that the cut-assisting lubricant 1 is placed on the whole surface of a region where the through-groove is to be formed. Therefore, the lubricating component of the cut-assisting lubricant 1 is supplied to the cutting tool 3 until the completion of the through-groove.

In a further alternative embodiment, the cut-assisting lubricant 1 in a solid state is placed in contact with the to-be-contacted portion of the cutting tool 3 for the workpiece material 2 (i.e., a portion that is to be contacted later with the workpiece material 2) at a stage prior to that shown in FIG. 3. The cut-assisting lubricant 1 is thereby attached to the to-De-contacted portion of the cutting tool 3 for the workpiece material 2. Next, the workpiece material 2 is cut such that the cutting tool 3 penetrates the workpiece material 2, to form a through-hole (through-hole formation step). This cutting work is performed while the cut-assisting lubricant 1-attached portion of the cutting tool 3 is contacted with the workpiece material 2. Next, the workpiece material 2 is subsequently cut by moving the cutting tool 3 in a direction orthogonal or substantially orthogonal to the penetration direction, to form a through-groove as shown in FIG. 3 (through-groove formation step). Even in the process of cutting, a lubricating component of the cut-assisting lubricant 1 contacted with the cutting tool 3 is melted and runs off the surface of the cutting tool 3. Therefore, the lubricating component of the cut-assisting lubricant 1 is subsequently supplied to the contact portion of the cutting tool 3 with the workpiece material 2.

The cutting step in the cutting method of the present embodiment is not particularly limited as long as the cutting work is performed while the cut-assisting lubricant is contacted with the contact portion of the cutting tool with the workpiece material and/or the contact portion (including a to-be-processed portion) of the workpiece material with the cutting tool. The cutting work may be performed, for example, using the cutting tool contacted in advance with the cut-assisting lubricant. Specific examples of the embodiment of "while contacting" include, but are not particularly limited to: an embodiment in which after a contact step of contacting the cut-assisting lubricant with the cutting tool before cutting work so that the cut-assisting lubricant is attached thereto, the to-be-processed portion of the workpiece material is cut with the cut-assisting lubricant-attached cutting tool; an embodiment in which after a close contact step of closely contacting the cut-assisting lubricant with the to-be-processed portion (a portion to serve as the exit of the cutting tool and/or a portion to serve as the entrance of the cutting tool) of the workpiece material, the to-be-processed portion of the workpiece material is cut; and an embodiment in which in the cutting step, the cut-assisting lubricant is contacted with the cutting tool, and the workpiece material is cut in the cut-assisting lubricant-attached state. One of these embodiments may be adopted alone, or two or more thereof may be used in combination.

The cutting work to form a through-groove using a cutting tool such as a router bit is more likely to cause the abrasion of the cutting tool due to a long cutting distance, as compared with drilling work with a drill bit or the like, and splintering occurs easily at the entrance portion or the exit portion of cutting tool penetration. This is because the cutting tool is moved in contact with the workpiece material in a direction orthogonal or substantially orthogonal to the penetration direction, and this increases the volume of a fiber reinforced composite material to be removed by the cutting work and increases load to the cutting tool.

In this respect, in the present embodiment, use of the cut-assisting lubricant in the cutting work to form a through-groove in a fiber reinforced composite material can reduce load to a cutting tool (e.g., a router bit, suppress the abrasion of the cutting tool, and prolong the lifespan of the cutting tool, by the action of the cut-assisting lubricant as a lubricant agent. As a result, cost required for cutting tools, the number of runs of a cutting tool change step, or the like can be reduced. Thus, cutting work excellent in productivity is achieved.

Furthermore, use of the cut-assisting lubricant in the cutting work to form a through-groove in a fiber reinforced composite material can suppress burrs, chippings, or splintering at the entrance portion or the exit portion of cutting tool penetration by the action of the cut-assisting lubricant as a lubricant agent. As a result, a high quality cut portion can be obtained, as compared with the case of not using the cut-assisting lubricant.

Moreover, use of the cut-assisting lubricant in the formation of a through-groove renders a cutting tool insusceptible to change in its dimension caused by abrasion. As a result, a through-groove width can be prevented from being narrowed as the cutting step proceeds. In addition, use of the cut-assisting lubricant in the formation of a through-groove renders a cutting tool insusceptible to change in its dimension caused by abrasion in the thickness direction of a workpiece material. Therefore, the difference in through-groove width between the front and back of the workpiece material is further decreased. Thus, a through-groove having a more uniform through-groove width is obtained.

The cut-assisting lubricant can be preferably used not only when the to-be-processed portion of the workpiece material has a flat surface but when the to-be-processed portion has a curved surface, as with the flat surface. Specifically, the cut-assisting lubricant is excellent in flexibility and to-be-processed portion following properties, and permits cutting work in close contact with a workpiece material having a curved surface. The cut-assisting lubricant preferably has a configuration that impairs neither the flexibility of the cut-assisting lubricant itself nor its to-be-processed portion following properties, and specifically, is preferably in a form free from thick metal foil or the like, though the configuration is not particularly limited thereto. This further improves the cutting workability of the workpiece material having a curved surface. Also, the cut-assisting lubricant free from metal foil can prevent the cut portion of the workpiece material from being contaminated by the adhesion of metal toil-derived metal scraps to the cut portion of the workpiece material. As a result, the cutting work of the present embodiment can be superior in quality to the cutting work of conventional techniques.

[Contact Step]

The cutting method of the present embodiment is not particularly limited as long as the method comprises a cutting step of cutting a workpiece material with a cutting tool while contacting a cut-assisting lubricant with the contact portion of the cutting tool with the workpiece material and/or the contact portion including a to-be-processed portion) of the workpiece material with the cutting tool. The cutting method of the present embodiment may optionally comprise a contact step. The contact step is the step of contacting the cut-assisting lubricant with the cutting tool before the cutting step. The cut-assisting lubricant is contacted in advance with the cutting tool to thereby supply a lubricating component of the cut-assisting lubricant to the tip of the cutting tool immediately before processing. Therefore, the lubricating effect of the cut-assisting lubricant is exerted more effectively. In this operation, the contact method for contacting the cut-assisting lubricant with the cutting tool is not particularly limited. For example, the cut-assisting lubricant is placed on the entrance face side (entry face side) of the cutting tool for the workpiece material so that the cut-assisting lubricant can be attached to the cutting tool before the cutting step. Alternatively, the cut-assisting lubricant is applied in advance to the cutting tool so that the cut-assisting lubricant can be attached to the cutting tool. Furthermore, the cut-assisting lubricant is cut off, cut, and/or drilled with the cutting tool before the cutting step so that the cut-assisting lubricant can be attached to the cutting tool.

[Close Contact Step]

The cutting method of the present embodiment may optionally comprise a close contact step of closely contacting in advance the cut-assisting lubricant with a portion to serve as the exit of the cutting tool and/or a portion to serve as the entrance of the cutting tool, in the workpiece material before the cutting step. The close contact site on the workpiece material with the cut-assisting lubricant may be either of the portion to serve as the exit of the cutting tool or the portion to serve as the entrance of the cutting tool, or may be both of the portion to serve as the exit of the cutting tool and the portion to serve as the entrance of the cutting tool, in advance. This can reduce load to the cutting tool, as mentioned above, and can reduce the occurrence of burrs, chippings, or splintering at the periphery of a cut portion. In this context, the "portion to serve as the exit" means a portion that should become the opening of a through-groove on a side where the tip of the cutting tool protrudes from the formed through-groove. If this portion is a face, this term can be used interchangeably with a face to serve as the exit. In response to this, the "portion to serve as the entrance" means a portion that should become the opening of a through-groove on a side opposite to the "portion to serve as the exit" in the formed through-groove. If this portion is a face, this term can be used interchangeably with a face to serve as the entrance.

The portion with which the cut-assisting lubricant is to be closely contacted in advance may be a portion to serve as a starting point for forming the through-groove, may be the whole surface of a region where the through-groove is to be formed (see, for example, FIG. 2), or may be the surface of a part of the region where the through-groove is to be formed (a part of the region except for the portion to serve as a starting point). In this context, the portion to serve as a starting point for forming the through-groove is a portion to serve as the entrance of the cutting tool and is a portion on the workpiece material at which the cutting tool comes in initial contact with the workpiece material upon formation of the through-groove. This is because the close contact of the cut-assisting lubricant in advance with the portion to serve as a starting point for forming the through-groove, or the whole surface of a region where the through-groove is to be formed can reduce load to the cutting tool, as mentioned above, and can reduce the occurrence of splintering at the periphery of a cut portion. Particularly, the close contact of the cut-assisting lubricant in advance with the whole surface of a region where the through-groove is to be formed is preferred because this can further reduce the occurrence of splintering at the periphery of a cut portion.

The cut-assisting lubricant is closely contacted with the portion to serve as a starting point for forming the through-groove, to thereby transfer a lubricating component of the cut-assisting lubricant to the tip of the cutting tool immediately before processing. Therefore, the lubricating effect of the cut-assisting lubricant is exerted more effectively. This can further reduce load to the cutting tool and tends to be able to suppress the abrasion of the cutting tool and reduce the occurrence of burrs, chippings, or splintering in the neighborhood of the starting point for forming the through-groove. Alternatively, the cut-assisting lubricant is closely contacted with the whole surface of a region where the through-groove is to be formed, to thereby continuously transfer a lubricating component of the cut-assisting lubricant to the tip of the cutting tool during cutting work. Therefore, the lubricating effect of the cut-assisting lubricant is exerted much more effectively. This can particularly remarkably reduce load to the cutting tool and tends to be able to remarkably suppress the abrasion of the cutting tool and remarkably reduce the occurrence of burrs, chippings, or splintering in the region where the through-groove is to be formed. Alternatively, the cut-assisting lubricant is closely contacted with the surface of a part of the region where the through-groove is to be formed, i.e., a part of the region except for the portion to serve as a starting point, to thereby transiently transfer a lubricating component of the cut-assisting lubricant to the tip of the cutting tool during cutting work. Therefore, the lubricating effect of the cut-assisting lubricant is exerted more effectively. This can further reduce load to the cutting tool and tends to be able to suppress the abrasion of the cutting tool and reduce the occurrence of burrs, chippings, or splintering in the neighborhood of the part of the region where the through-groove is to be formed. When the portion with which the cut-assisting lubricant is to be closely contacted in advance is both of a portion to serve as a starting point for forming the through-groove, and the surface of a part of the region where the through-groove is to be formed (a part of the region except for the portion to serve as a starting point), the aforementioned effects based thereon can be multiply exerted. Particularly, from the viewpoint of better balance between the amount of the cut-assisting lubricant used and the effects brought about by use thereof, such as reduction in load to the cutting tool, suppression of the abrasion of the cutting tool, and reduction in the occurrence of burrs or the like, the portion with which the cut-assisting lubricant is to be closely contacted in advance may be preferably both of a portion to serve as a starting point for forming the through-groove, and the surface of a part of the region where the through-groove is to be formed (a part of the region except for the portion to serve as a starting point).

The cut-assisting lubricant is closely contacted with a portion to be initially penetrated by the cutting tool in the portion to serve as the exit of the cutting tool, to thereby supply a lubricating component of the cut-assisting lubricant to the tip of the cutting tool at the start of penetration of the cutting tool. Therefore, the lubricating effect of the cut-assisting lubricant is exerted more effectively. This can reduce load to the cutting tool and tends to be able to suppress the abrasion of the cutting tool and reduce the occurrence of burrs, chippings, or splintering in the neighborhood of the portion to be initially penetrated by the cutting tool. Furthermore, the cut-assisting lubricant is placed, for use, on a portion to be initially penetrated by the cutting tool, in the workpiece material so that the cut-assisting lubricant can act like a lid to thereby suppress burrs, chippings, or splintering upon initial penetration of the cutting tool.

In the cutting work of a fiber reinforced composite material, the mechanism underlying the occurrence of burrs, chippings, or splintering at a portion to be initially penetrated by the cutting tool is as described below. When the tip of a tool starts to penetrate the lowermost layer of the fiber reinforced composite material, the workpiece material starts to split in a direction parallel to the fiber. As the tool gradually comes down, the fiber of the workpiece material is cut off around the center of the hole and cut off in a direction perpendicular to the fiber. Then, as the tool further comes down, the hole is expanded by pushing. In this case, the fiber held in a cantilevered state by the edge of the hole merely falls in the rotational direction of the tool without being cut off. In this respect, processing can be performed with the cut-assisting lubricant placed on a portion to be initially penetrated by the cutting tool, in the workpiece material to thereby prevent the fiber of the workpiece material from being held in a cantilevered state by the edge of the hole. Thus, the fiber of the workpiece material can be neatly cut off along the edge of the hole. As a result, this approach can suppress the occurrence of burrs, chippings, or splintering and yield a high quality cut through-groove, as compared with conventional methods. Particularly, in the case of using a router bit, cutting work superior in productivity and quality to that of conventional techniques is achieved with the router bit.

For continuous cutting work, i.e., continuous formation of a plurality of through-grooves, the cutting tool is contacted once with the cut-assisting lubricant placed at a portion to serve as the exit of the cutting tool and/or a portion to serve as the entrance of the cutting tool so that the cut-assisting lubricant is attached to the cutting tool (e.g., a router bit). Therefore, the effects of reducing load to the cutting tool, suppressing the abrasion of the cutting tool, and prolonging the lifespan of the cutting tool can be obtained in subsequent processing.

Examples of the method for closely contacting the cut-assisting lubricant with the workpiece material include, but are not particularly limited to: a method which involves physically fixing the cut-assisting lubricant and the workpiece material with a clip or a jig; and a method using the cut-assisting lubricant having a layer of a compound having adhesiveness (adhesive layer) on the surface of the cut-assisting lubricant or the surface of metal foil to be contacted with the workpiece material. Among them, the method using the cut-assisting lubricant having an adhesive layer is preferred because this method eliminates the need of fixation with a jig or the like. In the present specification, the "adhesive layer" is defined as a layer of a compound having adhesiveness that is used for fixing the workpiece material and the cut-assisting lubricant.

[Cutting Step]

The cutting step is the step of cutting a workpiece material with a cutting tool to thereby form a through-groove in the workpiece material, where n the through-groove is formed by cutting the workpiece material with the cutting tool while contacting a cut-assisting lubricant with the contact portion of the cutting tool with the workpiece material and/or the contact portion (to-De-processed portion) of the workpiece material with the cutting tool. Use of the cut-assisting lubricant in this way, for example, for cutting work, particularly, continuous cutting work, enhances the lubricity between the cutting tool surface including the groove surface of the cutting tool and the inside wall surface of a cut portion, facilitates eliminating carbon fiber cut by the blade of the cutting tool, and decreases the frequency and degree of rubbing between the blade of the cutting tool and the inside wall surface of a cut portion. Therefore, the abrasion of the blade of the cutting tool is probably reduced. This principle of action applies to every general cutting tool.

In a preferred embodiment, the cutting step involves cutting the workpiece material with the cutting tool while contacting a cut-assisting lubricant with the cutting tool. Examples of such an embodiment include: an embodiment in which the cat-assisting lubricant-attached cutting cool is used in the contact step mentioned above; an embodiment in which, as shown in FIG. 3, the cut-assisting lubricant is contacted with and attached to the cutting tool in advance in the cutting step; and an embodiment in which in the close contact step mentioned above, the cutting tool contacted with the cut-assisting lubricant closely contacted with the workpiece material is used so that the cut-assisting lubricant is consequently contacted with the cutting tool. FIG. 3 shows an embodiment in which the cut-assisting lubricant is used in contact with the cutting tool without being closely contacted with the workpiece material. The cutting work is performed while the cut-assisting lubricant 1 is contacted with the cutting tool 3 as shown in FIG. 3, to thereby constantly supply the cut-assisting lubricant 1 to the cutting tool 3. Thus, the cutting work can be performed more efficiently. In the case of using the cut-assisting lubricant 1 in close contact with the workpiece material 2 as shown in FIG. 1 or 2, the cut-assisting lubricant 1 in an amount calculated from the thickness of the cut-assisting lubricant 1× router bit diameter (area of a portion to be contacted with the cutting tool) is supplied to the cutting tool 3. In this case, additional use of another cut-assisting lubricant different from the cut-assisting lubricant 1 allows a more sufficient amount of the cut-assisting lubricants to be supplied to the cutting tool.

In another preferred embodiment, the cutting step involves cutting the workpiece material with the cutting tool while contacting a cut-assisting lubricant with the to-be-processed portion of the workpiece material. Examples of such an embodiment include: an embodiment in which in the contact step mentioned above, the cut-assisting lubricant-attached cutting tool is used so that the cut-assisting lubricant is consequently contacted with the to-be-processed portion of the workpiece material; and an embodiment in which the close contact step mentioned above is adopted.

Two or more of these embodiments of contacting a cut-assisting lubricant with the cutting tool and/or the to-be-processed portion of the workpiece material may be combined. Examples of such a combination include an embodiment in which in the cutting step, the cutting tool is used in a cut-assisting lubricant-attached state (see, for example, FIG. 3) to cut the workpiece material closely contacted with another cut-assisting lubricant different therefrom.

The cutting step preferably comprises the steps of: cutting the workpiece material with the cutting tool to thereby form a through-hole in the workpiece material (through-hole formation step); and forming the through-groove in the workpiece material by cutting the workpiece material while moving the cutting tool inserted in the through-hole in a direction orthogonal or substantially orthogonal to the penetration direction of the through-hole (through-groove formation step). In the through-groove formation step, the workpiece material is cut with the cutting tool while a cut-assisting lubricant is contacted with the contact portion of the cutting tool with the workpiece material and/or the contact portion of the workpiece material with the cutting tool. This renders the cutting tool insusceptible to change in its dimension caused by abrasion. As a result, a through-groove width can be prevented from being narrowed as the through-groove formation step proceeds. Use of the cut-assisting lubricant in the formation of a through-groove renders the cutting tool insusceptible to change in its dimension caused by abrasion in the thickness direction of the workpiece material. Therefore, the difference in through-groove width between the front and back of the workpiece material is further decreased. Thus, a through-groove having a more uniform through-groove width is obtained.

The through-groove obtained by the cutting work is not particularly limited as long as the groove penetrates the workpiece material. The width of the through-groove is not particularly limited and is, for example, 0.5 mm or larger, preferably 1.0 mm or larger, more preferably 2.0 mm or larger. The upper limit of the width of the through-groove is not particularly limited and is preferably, for example, 20 mm or smaller. The length of the through-groove is not particularly limited as long as the length is equal to or larger than the width of the groove. The length of the through-groove is, for example, 600 mm or larger, preferably 1000 mm or larger. The upper limit of the length of the through-groove is not particularly limited and is preferably, for example, 5000 mm or smaller. This is because, even if the length of the through-groove is 600 mm or larger, use of the cut-assisting lubricant reduces the abrasion of the cutting tool and further improves the quality of a cut portion (through-groove).

The shape of the through-groove viewed in its penetration direction is not particularly limited and may be linear, curved, or polygonally linear, may be a U or V shape, or may be an irregular shape such as a helical shape. The cross sectional shape of the through-groove is not particularly limited, and the cross section is usually rectangular.

The thickness of the workpiece material is not particularly limited and is usually 0.5 mm or larger, preferably 1 mm or larger, more preferably 2 mm or larger. The upper limit of the thickness of the workpiece material is not particularly limited and is preferably, for example, 40 mm or smaller. This is because, even if the thickness of the workpiece material is 0.5 mm or larger, use of the cut-assisting lubricant reduces the abrasion of the cutting tool and further improves the quality of a cut portion (through-groove). On the other hand, when the thickness of the workpiece material is 40 mm or smaller, a lubricating component of the cut-assisting lubricant can be more sufficiently spread out in the cutting edge and groove portions of the cutting tool. This reduces the abrasion of the cutting tool and further improves the quality of a cut portion (through-groove).

The type of the cutting tool is not particularly limited, and a router bit generally used in the formation of through-grooves is preferred. The router bit is not particularly limited by its diameter, material, snaps, and presence or absence of a surface coating as long as the router bit is generally used. The material of the router bit is preferably a cemented carbide produced by sintering a powder of a hard metal carbide. Examples of such a cemented carbide include, but are not particularly limited to, a metal produced by sintering a mixture of tungsten carbide and a binder cobalt. Since such a cemented carbide further improves material characteristics according to a usage purpose, titanium carbide, tantalum carbide, or the like may be further contained therein. On the other hand, the shape of the router bit can be appropriately selected according to the conditions of cutting work, the type and shape of the workpiece material, etc. The shape of the router bit is not particularly limited and is selected, for example, from the viewpoint of the direction of twist of the router bit, from the viewpoint of the angle of twist of its groove, and from the viewpoint of the number of cutting edges. The surface coating of the router bit can be appropriately selected according to the conditions of cutting work, the type and shape of the workpiece material, etc. Preferred examples of the type of the surface coating include diamond coating, diamond like coating, and ceramic coating.

In the cutting step, a general cutting work technique can be used. Examples thereof include cutting work that is performed while a site under cutting work and/or the cutting tool is cooled using a gas or a liquid. Examples of the method for cooling a site under cutting work and/or the cutting tool using a gas include: a method which involves supplying a compressed gas to the site under cutting work and/or the cutting tool; and a method which involves supplying an ambient gas to the site under cutting work and/or the cutting tool by aspirating the gas in the neighborhood of the site under cutting work and/or the cutting tool.

[Cut-Assisting Lubricant]

Examples of the cut-assisting lubricant used in the cutting method of the present embodiment include, but are not particularly limited to, a cut-assisting lubricant comprising a polymer material and an inorganic filler. Specifically, the cut-assisting lubricant is preferably a cut-assisting lubricant containing a polymer material, for example, a water soluble or non-water soluble thermoplastic resin or thermosetting resin, and an inorganic filler, for example, graphite, molybdenum disulfide, tungsten disulfide, or a molybdenum compound. More specifically, the cut-assisting lubricant is more preferably a cut-assisting lubricant containing a high molecular weight compound (A) having a weight average molecular weight of $5 \times 10^4$ or higher and $1 \times 10^5$ or lower, a medium molecular weight compound (B) having a weight average molecular weight of $1 \times 10^3$ or higher and lower than $5 \times 10^4$, and a carbon (C). Use of such a cut-assisting lubricant can further reduce load to the cutting tool and tends to be able to further reduce the occurrence of burrs, chippings, or splintering at the periphery of a cut portion.

The shape of the cut-assisting lubricant is not particularly limited as long as the shape allows the workpiece material to be cut with the cutting tool while the cut-assisting lubricant is contacted with the contact portion of the cutting tool with the workpiece material and/or the contact portion (to-be-processed portion) of the workpiece material with the cutting tool. Examples of such a cut-assisting lubricant include a cut-assisting lubricant in the form of a sheet, a cut-assisting lubricant in the form of a block such as a round bar shape or a square bar shape, and a cut-assisting lubricant in a melted state. Among them, the cut-assisting lubricant in the form of a sheet is preferred.

The cut-assisting lubricant may be a monolayer body comprising a polymer material and an inorganic filler, or may be a multilayer body having a layer comprising a polymer material and an inorganic filler, and an additional layer. Examples of the additional layer include an adhesive layer for improving the adhesion between the cut-assisting lubricant and the workpiece material, and a protective layer for preventing scratches on the surface of the cut-assisting lubricant. Hereinafter, the configuration of the cut-assisting lubricant will be described.

(High Molecular Weight Compound (A))

The nigh molecular weight compound (A) can function as a lubricant agent and is capable of exerting the effects of improving the lubricity of the cut-assisting lubricant and reducing the occurrence of chippings, burrs, or splintering at the periphery of a cut portion. The high molecular weight compound (A) can further function as a molding agent and is capable of exerting the effects of improving the moldability of the cut-assisting lubricant and forming a monolayer (a layer (sheet) can be formed in itself without the use of a support base material). The high molecular weight compound (A) may have a weight average molecular weight of $5.0 \times 10^4$ or higher and $1.0 \times 10^6$ or lower. Examples thereof include thermoplastic resins such as water soluble thermoplastic resins and non-water soluble thermoplastic resins, and thermosetting resins such as water soluble thermosetting resins and non-water soluble thermosetting resins. Among them, a thermoplastic resin, i.e., a water soluble thermoplastic resin and/or a non-water soluble thermoplastic resin, is preferred, and a water soluble thermoplastic resin is more preferred. Examples of the water soluble thermoplastic resin and the non-water soluble thermoplastic resin include, but are not particularly limited to, water soluble resins and non-water soluble resins described below. The "water soluble resin" refers to a high molecular compound that is dissolved in an amount of 1 g or larger with respect to 100 g of water at 25° C. at 1 atm. One high molecular weight compound (A) may be used alone, or two or more thereof may be used in combination.

Use of the water soluble resin, particularly, the water soluble thermoplastic resin, tends to improve scrap eliminating properties at the time of cutting work by the lubricity of the resin. Also, use of the water soluble resin, particularly, the water soluble thermoplastic resin, moderately softens the surface hardness of the cot-ass sting lubricant and therefore tends to be able to further reduce load to the cutting tool. Furthermore, a resin component attached to the cut portion and its neighborhood can be easily removed after the cutting work. Examples of the water soluble thermoplastic resin include, but are not particularly limited to: polyalkylene oxide compounds such as polyethylene oxide, polypropylene oxide, and polyethylene oxide-propylene oxide copolymers; polyalkylene glycol compounds such as polyethylene glycol and polypropylene glycol; ester compounds of polyalkylene glycol; ether compounds of polyalkylene glycol; monostearate compounds of polyalkylene glycol, such as polyethylene glycol monostearate, polypropylene glycol monostearate, and polyglycerin monostearate; water soluble urethanes; water soluble polyether resins; water soluble polyesters; sodium poly(meth)acrylate; polyacrylamide; polyvinylpyrolidone; polyvinyl alcohol; saccharides such as cellulose and derivatives thereof; and modified polyamide. Among them, polyetylene oxide, polyethylene glycol, and a water soluble polyether resin are preferred from the viewpoint described above. One of these water soluble thermoplastic resins is used alone, or two or more thereof are used in combination.

Use of the non-water soluble resin, particularly, the non-water soluble thermoplastic resin, tends to increase the surface hardness of the cut-assisting lubricant, as compared with use of the water soluble resin. This improves the biting performance of the cutting tool at the time of cutting work, can form a cut portion at a position as designed, further improves the rigidity of the cut-assisting lubricant, and improves handleability. Examples of the non-water soluble thermoplastic resin include, but are not particularly limited to: urethane polymers; acrylic polymers; vinyl acetate polymers; vinyl chloride polymers; polyester polymers; polystyrene resins exemplified by polyethylene wax, styrene homopolymers (GPPS), styrene-butadiene copolymers (HIPS), and styrene-(meth)acrylic acid copolymers (e.g., MS resin); and copolymers thereof. One of these non-water soluble thermoplastic resins is used alone, or two or more thereof are used in combination.

The weight average molecular weight of the high molecular weight compound CA) is preferably $5.0 \times 10^4$ or higher, more preferably $6.0 \times 10^4$ or higher, further preferably $1.0 \times 10^5$ or higher, particularly preferably $1.25 \times 10^5$ or higher, exceedingly preferably $1.75 \times 10^5$ or higher. Also, the weight average molecular weight of the high molecular weight compound (A) is preferably $1.0 \times 10^6$ or lower, more preferably $8.0 \times 10^5$ or lower, further preferably $7.0 \times 10^5$ or lower, particularly preferably $6.0 \times 10^5$ or lower. When the weight average molecular weight of the high molecular weight compound (A) is $5.0 \times 10^4$ or higher, the moldability of the cut-assisting lubricant is further improved. When the weight average molecular weight of the high molecular weight compound (A) is $1.0 \times 10^6$ or lower, the lubricity brought about by the cut-assisting lubricant is further improved. In the case of using two or more high molecular weight compounds (A), it is preferred that the weight average molecular weight of a mixture of the two or more high molecular weight compounds (A) should satisfy the range of the weight average molecular weight described above, and it is more preferred that the respective weight average molecular weights of the compounds should satisfy the range of the weight average molecular weight described above. In the present embodiment, the weight average molecular weight can be measured by a method described in Examples (hereinafter, the same holds true for physical properties, etc. described in Examples).

The high molecular weight compound (A) may comprise a high molecular weight compound (A-1) having a weight average molecular weight of $3.0 \times 10^5$ or higher and $1.0 \times 10^6$ or lower and/or a high molecular weight compound (A-2) having a weight average molecular weight of $5.0 \times 10^4$ or higher and lower than $3.0 \times 10^5$, and preferably comprises both of the high molecular weight compound (A-1) and the high molecular weight compound (A-2). Combined use of the nigh molecular weight compound (A-1) and the high molecular weight compound (A-2) tends to further improve the moldability of the cut-assisting lubricant and the lubricity brought about by the cut-assisting lubricant.

The weight average molecular weight of the high molecular weight compound (A-1) is $3.0 \times 10^5$ or higher, preferably $4.0 \times 10^5$ or higher, more preferably $4.5 \times 10^5$ or higher, further preferably $5.0 \times 10^5$ or higher. Also, the weight average molecular weight of the high molecular weight compound (A-1) is $1.0 \times 10^6$ or lower, preferably $8.0 \times 10^5$ or lower, more preferably $7.0 \times 10^5$ or lower, further preferably $6.0 \times 10^5$ or lower.

The content of the high molecular weight compound (A-1) in the cut-assisting lubricant is preferably 5 parts by mass or larger, more preferably 10 parts by mass or larger, further preferably 15 parts by mass or larger, with respect to 100 parts by mass in total of the high molecular weight compound (A), the medium molecular weight compound (B), and the carbon (C). Also, the content of the nigh molecular weight compound (A-1) in the cut-assisting lubricant is preferably 35 parts by mass or smaller, more preferably 30 parts by mass or smaller, further preferably 25 parts by mass or smaller, with respect to 100 parts by mass in total of the high molecular weight compound (A), the medium molecular weight compound (B), and the carbon (c). When the content of the high molecular weight compound (A-1) is 5 parts by mass or larger, the moldability tends to be further improved. When the content of the high molecular weight compound (A-1) is 35 parts by mass or smaller, the lubricity tends to be further improved.

The weight average molecular weight of the high molecular weight compound (A-2) is $5.0 \times 10^4$ or higher, preferably $6.0 \times 10^4$ or higher, more preferably $1.0 \times 10^5$ or higher, further preferably $1.25 \times 10^5$ or higher. Also, the weight average molecular weight of the high molecular weight compound (A-2) is lower than $3.0 \times 10^5$, preferably $2.5 \times 10^5$ or lower, more preferably $2.0 \times 10^5$ or lower.

The content of the high molecular weight compound (A-2) in the cut-assisting lubricant is preferably 5 parts by mass or larger, more preferably 10 parts by mass or larger, further preferably 15 parts by mass or larger, with respect to 100 parts by mass in total of the high molecular weight compound (A), the medium molecular weight compound (B), and the carbon (C). Also, the content of the high molecular weight compound (A-2) in the cut-assisting lubricant is preferably 35 parts by mass or smaller, more preferably 30 parts by mass or smaller, further preferably 25 parts by mass or smaller, with respect to 100 parts by mass in total of the high molecular weight compound (A), the medium molecular weight compound (B), and the carbon (C). When the content of the nigh molecular weight compound (A-2) is 5 parts by mass or larger, the lubricity tends to be further improved. When the content of the high molecular weight compound (A-2) is 35 parts by mass or smaller, the moldability tends to be further improved.

The content of the high molecular weight compound (A) in the cut-assisting lubricant is preferably 10 parts by mass or larger, more preferably 20 parts by mass or larger, farther preferably 25 parts by mass or larger, particularly preferably 30 parts by mass or larger, with respect to 100 parts by mass in total of the high molecular weight compound (A), the medium molecular weight compound (B), and the carbon (C). Also, the content of the high molecular weight compound (A) in the cut-assisting lubricant is preferably 60 parts by mass or smaller, more preferably 55 parts by mass or smaller, further preferably 50 parts by mass or smaller, with respect to 100 parts by mass in total of the high molecular weight compound (A), the medium molecular weight compound (B), and the carbon (C). When the content of the high molecular weight compound (A) is 10 parts by mass or larger, the lubricity tends to be further improved. When the content of the high molecular weight compound (A) is 60 parts by mass or smaller, the moldability tends to be further improved. When the content of the high molecular weight compound (A) falls within the range described above, there is a tendency to further reduce load to the cutting tool and further reduce the occurrence of burrs, chippings, or splintering at the periphery of a cut portion. Particularly, when the content of the high molecular weight compound (A) is 20 parts by mass or larger, there is a tendency to further reduce the occurrence of burrs, chippings, or splintering in the through-groove and its neighborhood. More specifically, the content of the high molecular weight compound (A) is preferably 20 to 60 parts by mass, more preferably 25 to 55 parts by mass, further preferably 30 to 50 parts by mass, with respect to 100 parts by mass in total of the high molecular weight compound (A), the medium molecular weight compound (B), and the carbon (C).

(Medium Molecular Weight Compound (B))

The medium molecular weight compound (B) can function as a lubricant agent and is capable of exerting the effects of improving the lubricity of the cut-assisting lubricant and reducing the occurrence of chippings, burrs, or splintering at the periphery of a cut portion. The medium molecular weight compound (B), preferably has a weight average molecular weight of $1.0 \times 10^3$ or higher and lower than $5.0 \times 10^4$. Examples thereof include, but are not particularly limited to, thermoplastic resins such as water soluble thermoplastic resins and non-water soluble thermoplastic resins, and thermosetting resins such as water soluble thermosetting resins and non-water soluble thermosetting resins. Among them, a water soluble thermoplastic resin and a non-water soluble thermoplastic resin are preferred, and a water soluble thermoplastic resin is more preferred.

For example, resins that are resins of the same types as in the water soluble resin and the non-water soluble resin described in the preceding paragraph "High molecular weight compound (A)" and have a weight average molecular weight of $1.0 \times 10^3$ or higher and lower than $5.0 \times 10^4$ can be used as the water soluble thermoplastic resin and the non-water soluble thermoplastic resin. More specific examples of the medium molecular weight compound (b) include, but are not particularly limited to: polyalkylene glycol compounds such as polyethylene glycol, polypropylene glycol, and polytetramethylene glycol; monoether compounds of polyalkylene oxide, such as polyethylene oxide oleyl ether, polyethylene oxide cetyl ether, polyethylene oxide stearyl ether, polyethylene oxide lauryl ether, polyethylene oxide nonyl phenyl ether, and polyethylene oxide octyl phenyl ether; monostearate compounds of polyalkylene oxide, such as polyethylene oxide monostearate, polyethylene oxide sorbitan monostearate, and polyglycerin monostearate; and polyalkylene oxide compounds such as polyethylene oxide, polypropylene oxide, and polyethylene oxide-propylene oxide copolymers. Among them, polyethylene oxide monostearate is preferred. Use of such a medium molecular weight compound B) tends to further improve the lubricity. One medium molecular weight compound (B) may be used alone, or two or more thereof may be used in combination.

The high molecular weight compound (A) and the medium molecular weight compound (B), which differ in molecular weight, may also differ in their respective melt viscosities and melting points. Combined use of such a high molecular weight compound (A) and a medium molecular weight compound (B) has the following advantages: although use of the high molecular weight compound (A) alone, for example, reduces the moldability or lubricity of the cut-assisting lubricant due to too high a viscosity or too high a melting point of the cut-assisting lubricant, this can be suppressed. Although use of the medium molecular weight compound (B) alone reduces the moldability or lubricity of the cut-assisting lubricant due to too low a viscosity or too low a melting point of the cut-assisting lubricant, this can be suppressed. As a result, there is a tendency to further reduce load to the cutting tool and further reduce the occurrence of burrs, chippings, or splintering at the periphery of a cut portion.

The weight average molecular weight of the medium molecular weight compound (B) is preferably $1.0 \times 10^3$ or higher, more preferably $1.25 \times 10^3$ or higher, further preferably $1.5 \times 10^3$ or higher, still further preferably $2.0 \times 10^3$ or higher, particularly preferably $2.5 \times 10^3$ or higher, exceedingly preferably $3.0 \times 10^3$ or higher. Also, the weight average molecular weight of the medium molecular weight compound (B) is preferably lower than $5.0 \times 10^4$, more preferably $2.5 \times 10^4$ or lower, further preferably $2.0 \times 10^4$ or lower, still further preferably $1.0 \times 10^4$ or lower, particularly preferably $7.5 \times 10^3$ or lower, exceedingly preferably $5.0 \times 10^3$ or lower. When the weight average molecular weight of the medium molecular weight compound (B) is $1.0 \times 10^3$ or higher, the moldability of the cut-assisting lubricant is further improved. When the weight average molecular weight of the medium molecular weight compound (B) is lower than $5.0 \times 10^4$, the lubricity brought about by the cut-assisting lubricant is further improved. In the case of using two or more medium molecular weight compounds (B), it is preferred that the weight average molecular weight of a mixture of the two or more medium molecular weight compounds (B) should satisfy the range of the weight average molecular weight described above, and it is more preferred that the respective weight average molecular weights of the compounds should satisfy the range of the weight average molecular weight described above.

The content of the medium molecular weight compound (B) in the cut-assisting lubricant is preferably 10 parts by mass or larger, more preferably 20 parts by mass or larger, further preferably 30 parts by mass or larger, with respect to 100 parts by mass in total of the high molecular weight compound (A), the medium molecular weight compound (B), and the carbon (C). Also, the content of the medium molecular weight compound (B) in the cut-assisting lubricant is preferably 75 parts by mass or smaller, more preferably 60 parts by mass or smaller, further preferably 45 parts by mass or smaller, particularly preferably 40 parts by mass or smaller, with respect to 100 parts by mass in total of the high molecular weight compound (A), the medium molecular weight compound (B), and the carbon (C). When the content of the medium molecular weight compound (B) is 10 parts by mass or larger, the lubricity brought about by the cut-assisting lubricant tends to be further improved. When the content of the medium molecular weight compound (B) is 75 parts by mass or smaller, the moldability of the cut-assisting lubricant tends to be further improved. When the content of the medium molecular weight compound (B) falls within the range described above, there is a tendency to further reduce load to the cutting tool and further reduce the occurrence of burrs, chippings, or splintering at the periphery of a cut portion. More specifically, the content of the medium molecular weight compound (B) is preferably 10 to 75 parts by mass, more preferably 20 to 60 parts by mass, further preferably 30 to 45 parts by mass, with respect to 100 parts by mass in total of the high molecular weight compound (A), the medium molecular weight compound (B), and the carbon (C).

(Carbon (C))

The carbon (C) can function as a solid lubricant agent and is capable of exerting the effects of improving the lubricity brought about by the cut-assisting lubricant and prolonging the lifespan of the cutting tool in processing. Furthermore, the carbon (C) exists in a solid state having a volume at a temperature of cutting work and therefore, can further maintain the lubricity at the time of cutting work. Examples of the carbon (C) include, but are not particularly limited to, natural graphite, artificial graphite, active carbon, acetylene black, carbon black, colloidal graphite, pyrolytic graphite, expanded graphite, and flake graphite. Among others, the shape of the carbon (C) is preferably a flake shape. The carbon (C) whose shape is a flake shape (e.g., flake graphite) tends to further improve the abrasion reducing performance of the cut-assisting lubricant. One carbon (C) may be used alone, or two or more thereof may be used in combination.

In cutting work, particularly, cutting work to continuously form through-grooves, using the cut-assisting lubricant, the carbon (C) is attached to the surface or groove of the cutting tool and the inside wall surface of a cut portion in the workpiece material to thereby exhibit lubricity. In this case, the carbon (C) less varies in volume and hardness due to change in temperature, as compared with the high molecular weight compound (A) and the medium molecular weight compound (B), and can therefore keep constant volume and hardness in cutting work even if the temperature of the cutting tool or a processing site is elevated. Specifically, the carbon (C) can reside normally, for example, between the cutting tool and the workpiece material in cutting work to thereby enhance lubricity and exhibit effects similar to those of bearings. Therefore, the carbon (C) is effective for suppressing the abrasion of the cutting tool. The carbon (C) has moderately high hardness, as compared with other solid lubricant agents, and is therefore excellent in the bearing effects described above and excellent in lubricity. As a result, there is a tendency to further reduce load to the cutting tool and further reduce the occurrence of burrs, chippings, or splintering at the periphery of a cut portion.

The average particle size of the carbon (C) is preferably 50 μm or larger, more preferably 100 Cm or larger, further preferably 150 μm or larger, particularly preferably 200 μm or larger. Also, the average particle size of the carbon (C) is preferably 1000 μm or smaller, more preferably 750 μm or smaller, farther preferably 500 μm or smaller, particularly preferably 300 μm or smaller. When the average particle size of the carbon (C) is 50 rpm or larger, the lubricity and the moldability are further improved. As a result, there is a tendency to further reduce load to the cutting tool, prolong the lifespan of the cutting tool, and further reduce the occurrence of burrs, chippings, or splintering at the periphery of a cut portion. When the average particle size of the carbon (C) is 100 μm or larger, the lubricity and the moldability are further improved. As a result, there is a tendency to further prolong the lifespan of the cutting tool and further reduce the occurrence of burrs, chippings, or splintering in the through-groove and its neighborhood. When the average particle size of the carbon (C) is 1000 μm or smaller, there is a tendency to further suppress the abrasion of the cutting tool. In the case of comprising two or more carbons (C), it is preferred that the average particle size of a mixture of the two or more carbons (C) should satisfy the range described above, and it is more preferred that the respective average particle sizes of the carbons (C) should satisfy the range described above.

In the specification of the present application, the average particle size of the carbon (C) refers to a median size. The median size means a particle diameter that is obtained from the cumulative distribution curve (number based) of particle sizes and becomes 50% height in the curve (D50 value), and can be measured by a method described in Examples.

The content of the carbon (C) in the cut-assisting lubricant is preferably 5 parts by mass or larger, more preferably 15 parts by mass or larger, further preferably 20 parts by mass or larger, still further preferably 25 parts by mass or larger, particularly preferably 30 parts by mass or larger, with respect to 100 parts by mass in total of the high molecular weight compound (A), the medium molecular weight compound (B), and the carbon (C). Also, the content of the carbon (C) in the cut-assisting lubricant is preferably 70 parts by mass or smaller, more preferably 65 parts by mass or smaller, further preferably 60 parts by mass or smaller, with respect to 100 parts by mass in total of the high molecular weight compound (A), the medium molecular weight compound (B), and the carbon (C). When the content of the carbon (C) is 5 parts by mass or larger, the lubricity brought about by the cut-assisting lubricant tends to be further improved. When the content of the carbon (C) is 70 parts by mass or smaller, the moldability of the cut-assisting lubricant tends to be further improved. When the content of the carbon (C) falls within the range described above, there is a tendency to further reduce load to the cutting tool and further reduce the occurrence of burrs, chippings, or splintering at the periphery of a cut portion. More specifically, the content of the carbon (C) is preferably 5 to 70 parts by mass, more preferably 15 to 65 parts by mass, further preferably 20 to 60 parts by mass, with respect to 100 parts by mass in total of the high molecular weight compound (A), the medium molecular weight compound (B), and the carbon (C).

(Additional Component)

The cut-assisting lubricant may optionally contain an additional component. Examples of the additional component include lubricity improving components, formability improving components, plasticizers, softening agents, surface conditioners, leveling agents, antistatic agents, emulsifiers, antifoaming agents, wax additives, coupling agents, rheology controlling agents, antiseptics, antifungal agents, antioxidants, light stabilizers, nucleating agents, organic fillers, inorganic fillers, solid lubricant agents (other than the carbon (C)), heat stabilizers, and colorants.

Examples of the lubricity improving components include, but are not particularly limited to: amide compounds exemplified by ethylenebisstearamide, oleic acid amide, stearic acid amide, and methylenebisstearamide; fatty acid compounds exemplified by lauric acid, stearic acid, palmitic acid, and oleic acid; fatty acid ester compounds typified by butyl stearate, butyl oleate, and glycol laurate; aliphatic hydrocarbon compounds typified by liquid paraffin; and higher aliphatic alcohols typified by oleyl alcohol. At least one of these lubricity improving components can be selected.

Examples of the formability improving components include, but are not particularly limited to, epoxy resins, phenol resins, cyanate resins, melamine resins, urea resins, and thermosetting polyimide, which are thermosetting resins. At least one of these formability improving components can be selected.

When the cut-assisting lubricant is placed on the curved surface of a workpiece material (e.g., CFRP), a plasticizer or a softening agent contained in the cut-assisting lubricant can suppress cracks in the cut-assisting lubricant, for example, by mitigating stress or strain to the cut-assisting lubricant, and tends to further improve the curved surface following properties. Examples of the plasticizer or the softening agent include, but are not particularly limited to, phthalic acid ester, adipic acid ester, trimellitic acid ester, polyester, phosphoric acid ester, citric acid ester, epoxidized plant oil, and sebacic acid ester.

Examples of the solid lubricant agents other than the carbon (C) include, but are not particularly limited to, molybdenum disulfide, tungsten disulfide, molybdenum compounds, polytetrafluoroethylene, and polyamide.

(Adhesive Layer)

The cut-assisting lubricant may have an adhesive layer on a face to be contacted with the workpiece material. The adhesive layer carried by the cut-assisting lubricant tends to further improve the adhesion between the cut-assisting lubricant and the workpiece material.

The component constituting the adhesive layer is not particularly limited and is, for example, a thermoplastic resin and/or a thermosetting resin. Examples of the thermoplastic resin include, but are not particularly limited to, urethane polymers, acrylic polymers, vinyl acetate polymers, vinyl chloride polymers, polyester polymers, and copolymers thereof. Examples of the thermosetting resin include, but are not particularly limited to, resins such as phenol resins, epoxy resins, melamine resins, urea resins, unsaturated polyester resins, alkyd resins, polyurethane, thermosetting polyimide, and cyanate resins. Among them, an acrylic polymer is preferred because it is required to have the properties of leaving no paste on the workpiece material (e.g., CFRP) and being capable of easily adhering at ordinary temperature. A solvent type acrylic pressure sensitive adhesive and an acrylic emulsion type pressure sensitive adhesive (aqueous) are more preferred.

The adhesive layer may optionally contain a degradation preventing agent such as an antioxidant, and an inorganic filler such as calcium carbonate, talc, or silica, as components of the adhesive layer.

When the cut-assisting lubricant is removed from the workpiece material after the cutting work, the amount of a component of the cut-assisting lubricant attached to the workpiece material is preferably $1.0 \times 10^{-7}$ g or smaller, more preferably $5.0 \times 10^{-9}$ g or smaller, per $mm^2$ of the areas of the contact portion between the workpiece material and the cut-assisting lubricant, and the processed portion; or when the cut-assisting lubricant having the adhesive layer is removed from the workpiece material after the cutting work, the amount of a component of the cut-assisting lubricant and/or the adhesive layer attached to the workpiece material is preferably $1.0 \times 10^{-8}$ g or smaller, more preferably $5.0 \times 10^{-9}$ g or smaller, per $mm^2$ of the areas of the contact portion between the workpiece material and the cut-assisting lubricant, and the processed portion. The lower limit of the amount of a component of the cut-assisting lubricant and/or the adhesive layer attached to the workpiece material is not particularly limited and is preferably 0 g. In this context, the "processed portion" refers to the inside wall of a through-groove formed by the cutting work with, for example, a router bit.

(Thickness)

As mentioned above, the cut-assisting lubricant may be in the form of a sheet. In this case, the thickness of the cut-assisting lubricant excluding the adhesive layer is not particularly limited and is appropriately selected according to a cutting method for the cutting work of the workpiece material, a cut off method, the area or volume of a portion subjected to the cutting work, the size of the cutting tool for use in the cutting work, the blade length of the cutting tool, the configuration of the fiber reinforced composite material (CFRP), the thickness of the workpiece material, etc. Specifically, although the thickness of the cut-assisting lubricant is appropriately selected according to the factors mentioned above and therefore, is not particularly limited, the thickness is preferably 0.1 mm or larger, more preferably 0.2 mm or larger, farther preferably 0.5 mm or larger, particularly preferably 5 mm or larger. Also, the thickness is not limited by the effects of the present invention and is usually 100 mm or smaller, preferably 50 mm or smaller, more preferably 20 mm or smaller, further preferably 10 mm or smaller. When the thickness of the cut-assisting lubricant is 0.1 mm or larger, sufficient reduction in cutting stress tends to be obtained. When the thickness is 0.5 mm or larger, workability and handleability are further improved because the cut-assisting lubricant is strong enough to be handled. When the thickness of the cut-assisting lubricant is 5 mm or larger, the effect of reducing the narrowing of a through-groove width tends to become more apparent. This is because a thicker cut-assisting lubricant allows a larger amount of the lubricating component to be attached to the cutting tool and can be more expected to have the effect of protecting the cutting edge of the cutting tool. In the case of using the cut-assisting lubricant comprising a resin such as the high molecular weight compound (A), the resin can be prevented from serving as a binder for cutting chips. As a result, there is a tendency to be able to decrease cutting chips remaining on a cut portion. This tends to be able to suppress increase in the inside irregularity of the cut portion. In short, the lubricity can be further improved by securing the proper composition and thickness of the cut-assisting lubricant. Hence, the elimination of cutting chips through the groove of the cutting tool can be optimized for cutting work. Thus, usually, the effects of the present invention can be sufficiently obtained as long as the thickness of the cut-assisting lubricant is equal to or larger than the blade length of the cutting tool. For more effectively and reliably obtaining the effects of the present invention, it is preferred to appropriately control the thickness of the cut-assisting lubricant within the range mentioned above. A plurality of thin cut-assisting lubricants may be layered for use. In this case, it is preferred to appropriately control the total thickness of the plurality of layers within the range mentioned above.

The thickness of the adhesive layer is not particularly limited and is preferably 0.01 mm or larger, more preferably 0.05 mm or larger. Also, the thickness of the adhesive layer is preferably 5 mm or smaller, more preferably 2.5 mm or smaller.

The thickness of each layer constituting the cut-assisting lubricant is measured as follows: first, the cut-assisting lubricant is cut off in its thickness direction using a cross section polisher (CROSS-SECTION POLISHER SM-09010 manufactured by JEOL Ltd. DATUM Solution Business Operations) or an ultramicrotome (EM UC7 manufactured by Leica Camera AG). Next, the plane of section is observed in a direction perpendicular to the plane of section using a scanning electron microscope (SEM) (VE-7800 manufacture by Keyence Corp.) to measure the thickness of each layer constituting the cut-assisting lubricant. In this operation, the thicknesses of 5 sites per field of view are measured, and an average value thereof is used as the thickness of each layer.

[Method for Producing Cut-Assisting Lubricant]

The method for producing the cut-assisting lubricant of the present embodiment is not particularly limited, and a conventional method known in the art for molding a resin composition comprising a resin such as a polymer material, and a filler (e.g., an inorganic filler) into a sheet or the form of a block such as a round bar shape or a square bat shape can be widely used. Examples of such a production method include: a method which involves mixing the high molecular weight compound (A), the medium molecular weight compound (B), and the carbon (C) in the presence or absence of a solvent, applying the mixture to a support, solidifying the mixture by cooling to form a sheet, and then peeling off the support therefrom to obtain the cut-assisting lubricant; and a method which involves mixing the high molecular weight compound (A), the medium molecular weight compound (B), and the carbon (C) in the presence or absence of a solvent, extrusion molding the mixture into a sheet shape, and drawing the sheet, if necessary, to obtain the cut-assisting lubricant.

When the cut-assisting lubricant is the multilayer body mentioned above (e.g., a cut-assisting lubricant sheet having an adhesive layer and/or a protective layer), examples of the method for producing the multilayer body include, but are not particularly limited to: a method which involves preparing one layer in advance and directly forming another layer on at least one side thereof; and a method which involves laminating one layer prepared in advance and another layer by a lamination method using an adhesive resin or heat.

The method for forming an adhesive layer on the surface of the cut-assisting lubricant is not particularly limited as long as the method is known in the art and industrially used. Specific examples thereof include: a method which involves forming the adhesive layer by a roll method, a curtain coating method, a spraying method, or the like; and a method which involves forming in advance the adhesive layer having the desired thickness using a roll, a T-die extruder, or the like. The thickness of the adhesive layer is not particularly limited, and the optimum thickness can be appropriately selected according to the curvature of the workpiece material and the configuration of the cut-assisting lubricant.

In the case of producing the cut-assisting lubricant in a melted state, examples of the method therefor include: a method using, as the cut-assisting lubricant, a resin composition obtained by mixing a resin and a fillet; and a method using, as the cut-assisting lubricant, a resin composition obtained by mixing a resin, a filler, and a solvent.

[Workpiece Material]

The workpiece material that is subjected to the cutting method of the present embodiment is not particularly limited as long as the workpiece material comprises a fiber reinforced composite material. The fiber reinforced composite material is not particularly limited as long as the composite material is made of a matrix resin and a reinforcing fiber. Examples of the matrix resin include, but are not particularly limited to: thermosetting resins such as epoxy resins, phenol resins, cyanate resins, vinyl ester resins, and unsaturated polyester resins; and thermoplastic resins such as ABS (acrylonitrile-butadiene-styrene) resins, PA (polyamide) resins, PP (polypropylene) resins, PC (polycarbonate) resins, methyl methacrylate resins, polyethylene, and actyl, and polyester resins. Examples of the reinforcing fiber include, but are not particularly limited to, glass fiber, carbon fiber, and aramid fiber. Examples of the form of the reinforcing fiber include, but are not particularly limited to, filaments, tows, cloths, blades, chops, milled fibers, felt mats, papers, and prepregs. Specific examples of such a fiber reinforced composite material include, but are not particularly limited to, fiber reinforced plastics (FRP) such as carbon fiber reinforced plastics (CFRP), glass fiber reinforced plastics (GFRP), and aramid fiber reinforced plastics (AFRP). Among them, a carbon fiber reinforced plastic (CFRP) relatively having large tensile strength and tensile elastic force and small density is preferred. The fiber reinforced composite material may optionally contain an additional component such as an inorganic filler or an organic filler.

When the workpiece material is a fiber reinforced composite material densely containing finer, the amount of the fiber cut is large. This tends to facilitate the abrasion of the blade of a cutting tool. In the present embodiment, use of the cut-assisting lubricant can reduce the abrasion of the blade of a cutting tool. In the case of processing a fiber reinforced composite material with a more worn cutting tool, the cutting tool cuts the fiber reinforced composite material by pressing and cutting the fiber. Therefore, delamination occurs easily between layers of prepregs. As a result, there is the disadvantage that splintering occurs more easily at a portion of the exit to be initially penetrated by the cutting tool, in the workpiece material. However, in the present embodiment, use of the cut-assisting lubricant can further suppress splintering.

When the fiber reinforced composite material is a UD material, the entry of the blade of a cutting tool at an angle to bite and hollow out a carbon fiber bundle is more likely to cause fiber buckling in the inside wall of a cut portion. In this respect, in the present embodiment, use of the cut-assisting lubricant suppresses fiber buckling and, furthermore, suppresses even a rise in temperature caused by the heat of friction. As a result, the glass transition point (temperature) or softening point of the matrix resin becomes difficult to reach. Thus, the firmly bundled state of carbon fiber can be maintained, and fiber buckling can be suppressed. In this context, the "UD material" means a fiber reinforced composite material obtained using a cloth material of fibers aligned in only one direction.

EXAMPLES

Hereinafter, the present invention will be specifically described with reference to Examples and Comparative Examples. Examples described below are given merely for illustrating one example of the present embodiment. The present invention is not intended to be limited by these examples.

Table 1 shows specifications such as a workpiece material (cutting work material) used in each of Examples and Comparative Examples, each component used in the production of a cut-assisting lubricant, an adhesive layer, a router bit used in the cutting work, a cutting work instrument, and an apparatus used in evaluation.

TABLE 1

| Category | Notation in table | Name | Trade name/model | Manufacturer | Remarks |
|---|---|---|---|---|---|
| Workpiece material | CFRP | Carbon fiber reinforced plastic plate | — | — | Thickness: 2 mm |
| High molecular weight compound (A) | A-1 | Polyethylene oxide | Alkox E-45 | Meisei Chemical Works, Ltd. | $Mw = 5.6 \times 10^5$ |
| | A-2 | Polyethylene oxide | Alkox R-150 | Meisei Chemical Works, Ltd. | $Mw = 1.5 \times 10^5$ |
| Medium molecular weight compound (B) | B-1 | Polyoxyethylene monostearate | Nonion S-40 | NOF Corp. | $Mw = 3.5 \times 10^3$ |
| Carbon (C) | C-1 | Carbon (graphite) | XD100 | Ito Graphite Co., Ltd. | Flake shape, average particle size = 250 μm |
| | C-2 | Carbon (graphite) | XD150 | Ito Graphite Co., Ltd. | Flake shape, average particle size = 150 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Router bit | — | Router bit | RCM FT 2.0x8 | UNION TOOL | Direction of twist: right handed helix Diameter: 2.0 mm Blade length: 8 mm Not diamond coated |
| Cutting work instrument | — | Router processing instrument | TRT-MG | Toukoh Corp. | — |

The average particle size (medium size) of the carbon (C) was determined as follows: first, the carbon was dispersed in a solution consisting of a hexametaphosphoric acid solution and a few drops of triton, and the respective maximum lengths of projected carbon particles were measured using a laser diffraction particle size distribution analyzer. Then, the cumulative distribution curve (number based) of particle sizes was calculated. A particle diameter that became 50% height in the cumulative distribution curve (number based) was used as the average particle size.

The weight average molecular weights of the high molecular weight compound (A) and the medium molecular weight compound (B) were calculated as relative average molecular weights by dissolving or dispersing each of the high molecular weight compound (A) and the medium molecular weight compound (B) in a 0.05% salt solution, followed by measurement by liquid chromatography involving GPC (gel permeation chromatography) columns with polyethylene glycol as standards. The columns used were a total of five columns connected in series: one guard column TSK guardcolumn PWH (product name, 10 cm, manufactured by Tosoh Corp.), two analytical columns TSKgel G3000PW (product name, 30 cm, manufactured by Tosoh Corp.), and two analytical columns TSKgel GMPW (product name, 30 cm, manufactured by Tosoh Corp.).

[Procedure of Producing Cut-Assisting Lubricant Sheet]
(Cut-Assisting Lubricant Sheet a)

15 parts by mass of polyethylene oxide (Alkox E-45 (trade name) manufactured by Meisei Chemical Works, Ltd.) corresponding to the high molecular weight compound (A-1) and 15 parts by mass of polyethylene oxide (Alkox R-150 (trade name) manufactured by Meisei Chemical Works, Ltd.) corresponding to the high molecular weight compound (A-2), as the high molecular weight compound (A), 35 parts by mass of polyethylene oxide monostearate (Nonion S-40 (trade name) manufactured by NOF Corp.) as the medium molecular weight compound (B), and 35 parts by mass of graphite (XD100 (trade name) manufactured by Ito Graphite Co., Ltd.) corresponding to the carbon (C-1) as the carbon (C) were molded at a temperature of 140° C. using a single screw extruder to produce sheet α having a thickness of 1.0 mm. Subsequently, the strongly adhesive face of double faced tape having a thickness of 0.12 mm (No. 535A, manufactured by Nitto Denko Corp.) was affixed to one side of this sheet α to produce sheet a as a cut-assisting lubricant. Table 2 summarizes the cut-assisting lubricant.

(Cut-Assisting Lubricant Sheet b)

15 parts by mass of polyethylene oxide (Alkox E-45 (trade name) manufactured by Meisei Chemical Works, Ltd.) corresponding to the high molecular weight compound (A-1) and 15 parts by mass of polyethylene oxide (Alkox R-150 (trade name) manufactured by Meisei Chemical Works, Ltd.) corresponding to the high molecular weight compound (A-2), as the high molecular weight compound (A), 35 parts by mass of polyethylene oxide monostearate (Nonion S-40 (trade name) manufactured by NOF Corp.) as the medium molecular weight compound (B), and 35 parts by mass of graphite (XD100 (trade name) manufactured by Ito Graphite Co., Ltd.) corresponding to the carbon (C-1) as the carbon (C) were molded at a temperature of 140° C. using a single screw extruder to produce sheet β having a thickness of 2.0 mm. Subsequently, the strongly adhesive face of double faced tape having a thickness of 0.12 mm (No. 535A, manufactured by Nitto Denko Corp.) was affixed to one side of this sheet β to produce sheet b as a cut-assisting lubricant. Table 2 summarizes the cut-assisting lubricant.

(Cut-Assisting Lubricant Sheet c)

Five sheets α each having a thickness of 2.0 mm as described above were layered, softened by heating on a hot plate of 140° C., and pressed at a pressure of 50 kgf/m² for 5 minutes, followed by cooling to produce a sheet having a thickness of 5.0 mm. Subsequently, the strongly adhesive face of double faced tape having a thickness of 0.12 mm (No. 535A, manufactured by Nitto Denko Corp.) was affixed to one side of this sheet to produce sheet c as a cut-assisting lubricant. Table 2 summarizes the cut-assisting lubricant.

(Cut-Assisting Lubricant Sheet d)

Five sheets β each having a thickness of 2.0 mm as described above were layered, softened by heating on a hot plate of 140° C., and pressed at a pressure of 50 kgf/m² for 5 minutes, followed by cooling to produce a sheet having a thickness of 10 mm. Subsequently, the strongly adhesive face of double faced tape having a thickness of 0.12 mm (No. 535A, manufactured by Nitto Denko Corp.) was affixed to one side of this sheet to produce sheet d as a cut-assisting lubricant. Table 2 summarizes the cut-assisting lubricant.

(Cut-Assisting Lubricant Sheet e)

20 parts by mass of polyethylene oxide (Alkox E-45 (trade name) manufactured by Meisei Chemical Works, Ltd.) corresponding to the high molecular weight compound (A-1) and 20 parts by mass of polyethylene oxide (Alkox R-150 (trade name) manufactured by Meisei Chemical Works, Ltd.) corresponding to the high molecular weight compound (A-2), as the high molecular weight compound (A), 25 parts by mass of polyethylene oxide monostearate (Nonion S-40 (trade name) manufactured by NOF Corp.) as the medium molecular weight compound (B), and 35 parts by mass of graphite (XD100 (trade name) manufactured by Ito Graphite Co., Ltd.) corresponding to the carbon (C-1) as the carbon (C) were molded at a temperature of 140° C. using a single screw extruder to produce sheet γ having a thickness of 0.5 mm. Subsequently, the strongly adhesive face of double faced tape having a thickness of 0.12 mm (No. 535A, manufactured by Nitto Denko Corp.) was affixed to one side of this sheet γ to produce sheet e as a cut-assisting lubricant. Table 2 summarizes the cut-assisting lubricant.

(Cut-Assisting Lubricant Sheet f)

20 parts by mass of polyethylene oxide (Alkox E-45 (trade name) manufactured by Meisei Chemical Works, Ltd.) corresponding to the high molecular weight compound (A-1) and 20 parts by mass of polyethylene oxide (Alkox R-150 (trade name) manufactured by Meisei Chemical Works, Ltd.) corresponding to the high molecular weight compound (A-2), as the high molecular weight compound (A), 25 parts by mass of polyethylene oxide monostearate (Nonion S-40 (trade name) manufactured by NOF Corp.) as the medium molecular weight compound (B), and 35 parts by mass of graphite (XD100 (trade name) manufactured by Ito Graphite Co., Ltd.) corresponding to the carbon (C-1) as the carbon (C) were molded at a temperature of 140° C. using a single screw extruder to produce sheet δ having a thickness of 1.0 mm. Subsequently, the strongly adhesive face of double faced tape having a thickness of 0.12 mm (No. 535A, manufactured by Nitto Denko Corp.) was affixed to one side of this sheet δ to produce sheet f as a cut-assisting lubricant. Table 2 summarizes the cut-assisting lubricant.

(Cut-Assisting Lubricant Sheet g)

Ten sheets δ each having a thickness of 1.0 mm as described above were layered, softened by heating on a hot plate of 140° C., and pressed at a pressure of 50 kgf/m² for 5 minutes, followed by cooling to produce a sheet having a thickness of 10.0 mm. Subsequently, the strongly adhesive face of double faced tape having a thickness of 0.12 mm. (No. 535A, manufactured by Nitto Denko Corp.) was affixed to one side of this sheet to produce sheet g as a cut-assisting lubricant. Table 2 summarizes the cut-assisting lubricant.

(Cut-Assisting Lubricant Sheet h)

15 parts by mass of polyethylene oxide (Alkox E-45 (trade name) manufactured by Meisei Chemical Works, Ltd.) corresponding to the high molecular weight compound (A-1) and 15 parts by mass of polyethylene oxide (Alkox R-150 (trade name) manufactured by Meisei Chemical Works, Ltd.) corresponding to the high molecular weight compound (A-2), as the high molecular weight compound (A), 35 parts by mass of polyethylene oxide monostearate (Nonion S-40 (trade name) manufactured by NOF Corp.) as the medium molecular weight compound (B), and 35 parts by mass of graphite (XD150 (trade name) manufactured by Ito Graphite Co., Ltd.) corresponding to the carbon (C-2) as the carbon (C) were molded at a temperature of 140° C. using a single screw extruder to produce sheet s having a thickness of 1.0 mm. Subsequently, the strongly adhesive face of double faced tape having a thickness of 0.12 mm (No. 535A, manufactured by Nitto Denko Corp.) was affixed to one side of this sheet ε to produce sheet h as a cut-assisting lubricant. Table 2 summarizes the cut-assisting lubricant.

(Cut-Assisting Lubricant Sheet i)

15 parts by mass of polyethylene oxide (Alkox E-45 (trade name) manufactured by Meisei Chemical Works, Ltd.) corresponding to the high molecular weight compound (A-1) and 5 parts by mass of polyethylene oxide (Alkox R-150 (trade name) manufactured by Meisei Chemical Works, Ltd.) corresponding to the high molecular weight compound (A-2), as the high molecular weight compound (A), 75 parts by mass of polyethylene oxide monostearate (Nonion S-40 (trade name) manufactured by NOF Corp.) as the medium molecular weight compound (B), and 5 parts by mass of graphite (XD100 (trade name) manufactured by Ito Graphite Co., Ltd.) corresponding to the carbon (C-1) as the carbon (C) were molded at a temperature of 140° C. using a single screw extruder to produce sheet ζ having a thickness of 1.0 mm. Subsequently, the strongly adhesive face of double faced tape having a thickness of 0.12 mm (No. 535A, manufactured by Nitto Denko Corp.) was affixed to one side of this sheet ζ to produce sheet i as a cut-assisting lubricant. Table 2 summarizes the cut-assisting lubricant.

(Cut-Assisting Lubricant Sheet j)

5 parts by mass of polyethylene oxide (Alkox E-45 (trade name) manufactured by Meisei Chemical Works, Ltd.) corresponding to the high molecular weight compound (A-1) and 55 parts by mass of polyethylene oxide (Alkox R-150 (trade name) manufactured by Meisei Chemical Works, Ltd.) corresponding to the high molecular weight compound (A-2), as the high molecular weight compound (A), 35 parts by mass of polyethylene oxide monostearate (Nonion S-40 (trade name) manufactured by NOF Corp.) as the medium molecular weight compound (B), and 5 parts by mass of graphite (XD100 (trade name) manufactured by Ito Graphite Co., Ltd.) corresponding to the carbon (C-1) as the carbon (C) were molded at a temperature of 140° C. using a single screw extruder to produce sheet f having a thickness of 1.0 mm. Subsequently, the strongly adhesive face of double faced tape having a thickness of 0.12 mm (No. 535A, manufactured by Nitto Denko Corp.) was affixed to one side of this sheet η to produce sheet j as a cut-assisting lubricant. Table 2 summarizes the cut-assisting lubricant.

(Cut-Assisting Lubricant Sheet k)

15 parts by mass of polyethylene oxide (Alkox E-45 (trade name) manufactured by Meisei Chemical Works, Ltd.) corresponding to the high molecular weight compound (A-1) and 5 parts by mass of polyethylene oxide (Alkox R-150 (trade name) manufactured by Meisei Chemical Works, Ltd.) corresponding to the high molecular weight compound (A-2), as the high molecular weight compound (A), 10 parts by mass of polyethylene oxide monostearate (Nonion S-40 (trade name) manufactured by NOF Corp.) as the medium molecular weight compound (B), and 70 parts by mass of graphite (XD100 (trade name) manufactured by Ito Graphite Co., Ltd.) corresponding to the carbon (C-1) as the carbon (C) were molded at a temperature of 140° C. using a single screw extruder to produce sheet ι having a thickness of 1.0 mm. Subsequently, the strongly adhesive face of double faced tape having a thickness of 0.12 mm (No. 535A, manufactured by Nitto Denko Corp.) was affixed to one side of this sheet ι to produce sheet k as a cut-assisting lubricant. Table 2 summarizes the cut-assisting lubricant.

neighborhood of the through-groove on a side where the tip of the router bit protruded exit side) in the workpiece material are shown in Table 4.

Example 2

In Example 2, the produced cut-assisting lubricant sheet b was affixed to the whole surface of a region where a through-groove was to be formed by cutting work and which included a portion to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. Other processing conditions are shown in Table 3. Results of evaluating splintering in the neighborhood of the through-groove on a

TABLE 2

| Cut-assisting lubricant (sheet) | Composition | | | | | | | |
|---|---|---|---|---|---|---|---|---|
| | High molecular weight compound (A) | | Medium molecular weight compound | Carbon (C) | | | | |
| | A-1 part by mass | A-2 part by mass | (B) part by mass | C-1 part by mass | C-2 part by mass | Average particle size μm | Thickness mm | Adhesive layer |
| a | 15 | 15 | 35 | 35 | 0 | 250 | 1.0 | Present |
| b | 15 | 15 | 35 | 35 | 0 | 250 | 2.0 | Present |
| c | 15 | 15 | 35 | 35 | 0 | 250 | 5.0 | Present |
| d | 15 | 15 | 35 | 35 | 0 | 250 | 10.0 | Present |
| e | 20 | 20 | 25 | 35 | 0 | 250 | 0.5 | Present |
| f | 20 | 20 | 25 | 35 | 0 | 250 | 1.0 | Present |
| g | 20 | 20 | 25 | 35 | 0 | 250 | 10.0 | Present |
| h | 15 | 15 | 35 | 0 | 35 | 150 | 1.0 | Present |
| i | 15 | 5 | 75 | 5 | 0 | 250 | 1.0 | Present |
| j | 5 | 55 | 35 | 5 | 0 | 250 | 1.0 | Present |
| k | 15 | 5 | 10 | 70 | 0 | 250 | 1.0 | Present |

Example 1

In Example 1, a sample obtained by cutting off the produced cut-assisting lubricant sheet a into a size of 20 mm×20 mm was affixed to a portion to have a starting point for forming a through-groove by cutting work and to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. In the cutting work, the cutting distance of the tooter bit was 10 mm in the portion where the cut-assisting lubricant sheet a affixed to the starting point of the through-groove was placed. Other processing conditions are shown in Table 3. Results of evaluating splintering in the side where the tip of the router bit protruded (exit side) in the workpiece material are shown in Table 4.

Example 3

In Example 3, a sample obtained by cutting off the produced cut-assisting lubricant sheet c into a size of 20 mm×20 mm was affixed to a portion to have a starting point for forming a through-groove by cutting work and to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. In the cutting work, the cutting distance of the router bit was 10 mm in the portion where the cut-assisting lubricant sheet a affixed to the starting point of the through-groove was placed. Other processing conditions are shown in Table 3. Results of evaluating splintering in the neighborhood of the through-groove on a side where the tip of the router bit protruded (exit side) in the workpiece material are shown in Table 4.

Example 4

In Example 4, a sample obtained by cutting off the produced cut-assisting lubricant sheet d into a size of 20 mm×20 mm was affixed to a portion to have a starting point for forming a through-groove by cutting work and to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a rooter bit diameter of 2 mm and a cutting distance of 2000 mm per router bit in the through-groove formation step. A linear through-groove having a width of 2 mm and a length of 2000 mm was formed through the through-hole formation step and the through-groove formation step. In the cutting work, the cutting distance of the router bit was 10 mm in the portion where the cut-assisting lubricant sheet a affixed to the starting point of the through-groove was placed. Other processing conditions are shown in Table 3. Results of evaluating splintering in the neighborhood of the through-groove on a side where the tip of the router bit protruded (exit side) in the workpiece material are shown in Table 4.

Example 5

In Example 5, the produced cut-assisting lubricant sheet e was affixed to the whole surface of a region where a through-groove was to be formed by cutting work and which included a portion to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. Other processing conditions are shown in Table 3. Results of evaluating splintering in the neighborhood of the through-groove on a side where the tip of the router bit protruded (exit side) in the workpiece material are shown in Table 4.

Example 6

In Example 6, the produced cut-assisting lubricant sheet f was affixed to the whole surface of a region where a through-groove was to be formed by cutting work and which included a portion to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. Other processing conditions are shown in Table 3. Results of evaluating splintering in the neighborhood of the through-groove on a side where the tip of the router bit protruded (exit side) in the workpiece material are shown in Table 4.

Example 7

In Example 7, the produced cut-assisting lubricant sheet g was affixed to the whole surface of a region where a through-groove was to be formed by cutting work and which included a portion to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. Other processing conditions are shown in Table 3. Results of evaluating splintering in the neighborhood of the through-groove on a side where the tip of the router bit protruded (exit side) in the workpiece material are shown in Table 4.

Example 8

In Example 8, a plurality of samples obtained by cutting off the produced cut-assisting lubricant sheet d into a size of 20 mm×20 mm were affixed to a portion to have a starting point for forming a through-groove by cutting work and to serve as the entrance (entrance portion) of the cutting tool router bit, and a region where a through-groove was to be formed by cutting work and which included the portion to serve as the entrance (entrance portion) of the cutting tool router bit, in the workpiece material such that the distance interval between sample-affixed portions was every 500 mm from the starting point. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. In the cutting work, the cutting distance of the router bit was 10 mm in the portion where the cut-assisting lubricant sheet a affixed to the starting point of the through-groove was placed. Other processing conditions are shown in Table 3. Results of evaluating splintering in the neighborhood of the through-groove on a side where the tip of the router bit protruded (exit side) in the workpiece material are shown in Table 4.

Example 9

In Example 9, a plurality of samples obtained by cutting off the produced cut-assisting lubricant sheet d into a size of 20 mm×20 mm were affixed to a portion to have a starting point for forming a through-groove by cutting work and to serve as the entrance (entrance portion) of the cutting tool router bit, and a region where a through-groove was to be formed by cutting work and which included the portion to serve as the entrance (entrance portion) of the cutting tool router bit, in the workpiece material such that the distance interval between sample-affixed portions was every 1000 mm from the starting point. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. In the cutting work, the cutting distance of the router bit was 10 mm in the portion where the cut-assisting lubricant sheet a affixed to the starting point of the through-groove was placed. Other processing conditions are shown in Table 3. Results of evaluating splintering in the neighborhood of the through-groove on a side where the tip of the router bit protruded (exit side) in the workpiece material are shown in Table 4.

Example 10

In Example 10, the produced cut-assisting lubricant sheet h was affixed to the whole surface of a region where a through-groove was to be formed by cutting work and which included a portion to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. Other processing conditions are shown in Table 3. Results of evaluating splintering in the neighborhood of the through-groove on a side where the tip of the router bit protruded (exit side) in the workpiece material are shown in Table 4.

Example 11

In Example 11, the produced cut-assisting lubricant sheet i was affixed to the whole surface of a region where a through-groove was to be formed by cutting work and which included a portion to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 me and a length of 2000 mm was formed through the through-hole formation step and the through-groove formation step. Other processing conditions are shown in Table 3. Results of evaluating splintering in the neighborhood of the through-groove on a side where the tip of the router bit protruded (exit side) in the workpiece material are shown in Table 4.

Example 12

In Example 12, the produced cut-assisting lubricant sheet j was affixed to the whole surface of a region where a through-groove was to be formed by cutting work and which included a portion to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. Other processing conditions are shown in Table 3. Results of evaluating splintering in the neighborhood of the through-groove or, a side where the tip of the router bit protruded (exit side) in the workpiece material are shown in Table 4.

Example 13

In Example 13, the produced cut-assisting lubricant sheet k was affixed to the whole surface of a region where a through-groove was to be formed by cutting work and which included a portion to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. Other processing conditions are shown in Table 3. Results of evaluating splintering in the neighborhood of the through-groove on a side where the tip of the router bit protruded (exit side) in the workpiece material are shown in Table 4.

Comparative Example 1

Cutting work was performed in the same way as in Example 1 except that the cut-assisting lubricant was not used and the workpiece material alone was fixed to the router processing instrument using a jig. Results of evaluating splintering in the neighborhood of the through-groove on a side where the tip of the router bit protruded (exit side) in the workpiece material are shown in Table 4.

[Evaluation: Splintering]

In Examples and Comparative Examples, the number of sites where splintering occurred in the neighborhood of the through-groove on the exit side of the router bit was visually counted per 200 mm of the cutting distance using a ×10 loupe (loupe having a magnification of 10 times). Criteria for the evaluation of splintering are as described below.

(Evaluation Criteria)

Splintering: phenomenon in which a part of fiber constituting a fiber reinforced composite material remains as burrs around processed portions without being cut off.

TABLE 3

| | Type and placement of cut-assisting lubricant | | Workpiece material | | Router processing conditions | | | |
|---|---|---|---|---|---|---|---|---|
| | | | | | Router bit | The number of | Moving | Cutting |
| | | | Material/ | Thickness | diameter | rotations | speed | distance |
| | Type | Place | configuration | mm | mmΦ | rpm | mm/min | mm |
| Example 1 | a | Tool entrance portion/ starting point of cut portion | CFRP | 2 | 2 | 12000 | 200 | 2000 |
| Example 2 | b | Tool entrance portion/ whole surface of cut portion | CPRP | 2 | 2 | 12000 | 200 | 2000 |
| Example 3 | c | Tool entrance portion/ starting point of cut portion | CFRP | 2 | 2 | 12000 | 200 | 2000 |
| Example 4 | d | Tool entrance portion/ stating point of cut portion | CFRP | 2 | 2 | 12000 | 200 | 2000 |
| Example 5 | e | Tool entrance portion/ whole surface of cut portion | CFRP | 2 | 2 | 12000 | 200 | 2000 |
| Example 6 | f | Tool entrance portion/ whole surface of cut portion | CFRP | 2 | 2 | 12000 | 200 | 2000 |
| Example 7 | g | Tool entrance portion/ whole surface of cut portion | CFRP | 2 | 2 | 12000 | 200 | 2000 |
| Example 8 | d | Tool entrance portion/ starting point of cut portion and every 500 mm | CFRP | 2 | 2 | 12000 | 200 | 2000 |
| Example 9 | d | Tool entrance portion/ starting point of cut portion and every 1000 mm | CFRP | 2 | 2 | 12000 | 200 | 2000 |
| Example 10 | h | Tool entrance portion/ whole surface of cut portion | CFRP | 2 | 2 | 12000 | 200 | 2000 |
| Example 11 | i | Tool entrance portion/ whole surface of cut portion | CFRP | 2 | 2 | 12000 | 200 | 2000 |
| Example 12 | j | Tool entrance portion/ whole surface of cut portion | CFRP | 2 | 2 | 12000 | 200 | 2000 |
| Example 13 | k | Tool entrance portion/ whole surface of cut portion | CFRP | 2 | 2 | 12000 | 200 | 2000 |
| Comparative Example 1 | None | — | CFRP | 2 | 2 | 12000 | 200 | 2000 |

TABLE 4

| | Type and placement of cut-assisting lubricant | | The number of sites having splintering at router bit exit (the number of sites per 200 mm) | | | | |
|---|---|---|---|---|---|---|---|
| | | | 0 mm- 200 mm | 201 mm- 400 mm | 401 mm- 600 mm | 601 mm- 800 mm | 801 mm- 1000 mm |
| | | | The number | The number | The number | The number | The number |
| | Type | Place | of sites | of sites | of sites | of sites | of sites |
| Example 1 | a | Tool entrance portion/ starting point of cut portion | 0 | 0 | 0 | 1 | 1 |
| Example 2 | b | Tool entrance portion/ whole surface of cut portion | 0 | 0 | 0 | 0 | 0 |
| Example 3 | c | Tool entrance portion/ starting point of cut portion | 0 | 0 | 0 | 0 | 2 |
| Example 4 | d | Tool entrance portion/ starting point of cut portion | 0 | 0 | 0 | 0 | 1 |

TABLE 4-continued

| | | | | | | | |
|---|---|---|---|---|---|---|---|
| Example 5 | e | Tool entrance portion/ whole surface of cut portion | 0 | 0 | 0 | 0 | 1 |
| Example 6 | f | Tool entrance portion/ whole surface of cut portion | 0 | 0 | 0 | 0 | 0 |
| Example 8 | d | Tool entrance portion/ starting point of cut portion and every 500 mm | 0 | 0 | 0 | 0 | 0 |
| Example 9 | d | Tool entrance portion/ starting point of cut portion and every 1000 mm | 0 | 0 | 0 | 0 | 2 |
| Example 10 | h | Tool entrance portion/ whole surface of cut portion | 0 | 0 | 0 | 0 | 1 |
| Example 11 | i | Tool entrance portion/ whole surface of cut portion | 0 | 0 | 0 | 1 | 2 |
| Example 12 | j | Tool entrance portion/ whole surface of cut portion | 0 | 0 | 0 | 2 | 2 |
| Example 13 | k | Tool entrance portion/ whole surface of cut portion | 0 | 0 | 0 | 1 | 3 |
| Comparative Example 1 | None | — | 0 | 0 | 1 | 4 | 6 |

| | The number of sites having splintering at router bit exit (the number of sites per 200 mm) | | | | |
|---|---|---|---|---|---|
| | 1001 mm- 1200 mm The number of sites | 1201 mm- 1400 mm The number of sites | 1401 mm- 1600 mm The number of sites | 1601 mm- 1800 mm The number of sites | 1801 mm- 2000 mm The number of sites |
| Example 1 | 4 | 3 | 4 | 4 | 5 |
| Example 2 | 2 | 3 | 3 | 2 | 4 |
| Example 3 | 4 | 4 | 5 | 4 | 4 |
| Example 4 | 4 | 4 | 5 | 3 | 3 |
| Example 5 | 1 | 2 | 3 | 3 | 4 |
| Example 6 | 2 | 2 | 2 | 2 | 3 |
| Example 8 | 1 | 1 | 3 | 2 | 0 |
| Example 9 | 4 | 3 | 4 | 2 | 2 |
| Example 10 | 2 | 3 | 3 | 3 | 4 |
| Example 11 | 2 | 3 | 4 | 3 | 4 |
| Example 12 | 3 | 3 | 2 | 2 | 4 |
| Example 13 | 4 | 2 | 3 | 3 | 3 |
| Comparative Example 1 | 5 | 7 | 7 | 7 | 6 |

Example 14

In Example 14, the produced cut-assisting lubricant sheet c was cut off into a size of 20 mm×20 mm, and this cut piece was affixed to a portion to have a starting point for forming a through-groove by cutting work and to serve as the entrance (entrance portion) of the cutting tool router bit, in the workpiece material. This workpiece material was fixed to the router processing instrument using a jig. The cutting work with the router bit was performed using CFRP having a thickness of 2 mm as the workpiece material under conditions involving a router bit diameter of 2 mm and a cutting distance of 2000 mm per router bit in the through-groove formation step. A linear through-groove having a width of 2 mm and a length of 2000 mm was formed through the through-hole formation step and the through-groove formation step. In the cutting work, the cutting distance of the router bit was 10 mm in the portion where the cut-assisting lubricant sheet c affixed to the starting point of the through-groove was placed. Other processing conditions are shown in Table 5. Results of evaluating a through-groove width in each cutting distance are shown in Table 6.

Example 15

In Example 15, cutting work was performed in the same way as in Example 14 except that the cut-assisting lubricant sheet d was used instead of the cut-assisting lubricant sheet c. Results of evaluating a through-groove width in each cutting distance are shown in Table 6.

Comparative Example 2

In Comparative Example 2, cutting work was performed in the same way as in Example 3 except that the cut-assisting lubricant sheet was not used and the workpiece material alone was fixed to the router processing instrument using a jig. Results of evaluating a through-groove width in each cutting distance are shown in Table 6.

[Evaluation: Groove Width Narrowing]

In Examples and Comparative Examples, the through-groove widths at the router bit entrance portion in the cutting distances of 10 mm, 260 mm, 510 mm, 760 mm, 1010 mm, 1260 mm, 1510 mm, 1760 mm, and 1990 mm were measured using a three-dimensional shape measuring machine. Criteria for the evaluation of groove width narrowing are as described below.

(Evaluation Criteria)

Groove width narrowing: the "groove width narrowing" was defined as a state where the through-groove width became equal to or smaller than 1940 µm corresponding to 97% of the router bit diameter 2.0 mm, and evaluated on the basis of a cutting distances at which the "groove width narrowing" occurred.

TABLE 5

| | Type and placement of cut-assisting lubricant | | Workpiece material | | Router processing conditions | | | |
|---|---|---|---|---|---|---|---|---|
| | | | | | Router bit | The number | Moving | Cutting |
| | | | Material/ | Thickness | diameter | of rotations | speed | distance |
| | Type | Place | configuration | mm | mmΦ | rpm | mm/min | mm |
| Example 14 | c | Tool entrance portion/starting point of cut portion | CFRP | 2 | 2 | 12000 | 200 | 2000 |
| Example 15 | d | Tool entrance portion/starting point of cut portion | CFRP | 2 | 2 | 12000 | 200 | 2000 |
| Comparative Example 2 | None | — | CFRP | 2 | 2 | 12000 | 200 | 2000 |

TABLE 6

| | Type and placement of cut-assisting lubricant | | Cutting distance until occurrence of grove width narrowing [mm] |
|---|---|---|---|
| | Type | Place | |
| Example 14 | c | Tool entrance portion/starting point of cut portion | 760-1010 |
| Example 15 | d | Tool entrance portion/starting point of cut portion | 760-1010 |
| Comparative Example 2 | None | — | less than 10 |

The present application is based on Japanese Patent Application No. 2015-230819 filed in the Japan Patent Office on Nov. 26, 2015, the contents of which are incorporated herein by reference. Also, the present application is based on Japanese Patent Application No. 2016-118726 filed in the Japan Patent Office on Jun. 15, 2016, the contents of which are incorporated herein by reference.

INDUSTRIAL APPLICABILITY

In the cutting work of a workpiece material, particularly, a difficult-to-cut material, the cut-assisting lubricant of the present invention improves the processing quality thereof and reduces processing cost, and therefore has industrial applicability.

REFERENCE SIGNS LIST

1 . . . Cut-assisting lubricant, 2 . . . Workpiece material, and 3 . . . Cutting tool.

The invention claimed is:

1. A cutting method comprising cutting a workpiece material with a cutting tool, the workpiece material and/or the cutting tool being contacted with a cut-assisting lubricant, to thereby form a through-groove in the workpiece material, wherein:
the cut-assisting lubricant comprises:
i) a compound (A) having a weight average molecular weight of $5.0 \times 10^4$ or higher and $1.0 \times 10^6$ or lower,
ii) a compound (B) having a weight average molecular weight of $1.0 \times 10^3$ or higher and lower than $5.0 \times 10^4$, and
iii) a carbon (C) having an average particle size of 100 μm or larger, and
the workpiece material comprises a fiber reinforced composite material.

2. The cutting method according to claim 1, wherein the cutting comprises:
cutting the workpiece material with the cutting tool to thereby form a through-hole in the workpiece material; and
forming the through-groove in the workpiece material by cutting the workpiece material while moving the cutting tool inserted in the through-hole in a direction orthogonal or substantially orthogonal to the penetration direction of the through-hole.

3. The cutting method according to claim 1, wherein the cutting method comprises contacting in advance the cut-assisting lubricant with a portion of the workpiece material to serve as a starting point for forming the through-groove.

4. The cutting method according to claim 1, wherein the cutting method comprises contacting in advance the cut-assisting lubricant with the whole surface of a region of the workpiece material where the through-groove is to be formed.

5. The cutting method according to claim 1, wherein the cutting tool is a router bit.

6. The cutting method according to claim 1, wherein the carbon (C) is flake graphite.

7. The cutting method according to claim 1, wherein
compound (A) comprises a thermoplastic resin having a weight average molecular weight of $5.0 \times 10^4$ or higher and $1.0 \times 10^6$ or lower, and
compound (B) comprises a thermoplastic resin having a weight average molecular weight of $1.0 \times 10^3$ or higher and $2.0 \times 10^4$ or lower.

8. The cutting method according to claim 1, wherein
compound (A) comprises a water-soluble thermoplastic resin and/or a non-water-soluble thermoplastic resin, wherein
the water-soluble thermoplastic resin is one or more resins selected from the group consisting of a polyalkylene oxide compound, a polyalkylene glycol compound, an ester compound of polyalkylene glycol, a monostearate compound of polyalkylene glycol, a water-soluble urethane, a water-soluble polyether resin, a water-soluble polyester, sodium poly(meth)acrylate, polyacrylamide, polyvinylpyrrolidone, polyvinyl alcohol, saccharides, and modified polyamide, and the non-water-soluble thermoplastic resin is one or more resins selected from the group consisting of a urethane polymer, an acrylic polymer, a vinyl acetate polymer, a vinyl chloride polymer, a polyester polymer, a polystyrene resin, and a copolymer thereof.

9. The cutting method according to claim 1, wherein compound (B) is one or more compounds selected from the group consisting of a polyalkylene glycol compound, a monoether compound of polyalkylene oxide, a monostearate compound of polyalkylene oxide, and a polyalkylene oxide compound.

10. The cutting method according to claim 1, wherein in the cut-assisting lubricant,
the content of compound (A) is 20 to 60 parts by mass with respect to 100 parts by mass in total of the high molecular weight compound (A), the medium molecular weight compound (B), and the carbon (C),
the content of compound (B) is 10 to 75 parts by mass with respect to 100 parts by mass in total of the high molecular weight compound (A), the medium molecular weight compound (B), and the carbon (C), and
the content of the carbon (C) is 5 to 70 parts by mass with respect to 100 parts by mass in total of the high molecular weight compound (A), the medium molecular weight compound (B), and the carbon (C).

11. The cutting method according to claim 1, wherein the cut-assisting lubricant is in the form of a sheet having a thickness of 0.1 mm or larger.

12. The cutting method according to claim 1, wherein the cut-assisting lubricant has an adhesive layer to be contacted with the workpiece material.

13. The cutting method according to claim 12, wherein the adhesive layer comprises an acrylic polymer.

14. The cutting method according to claim 1, wherein the fiber reinforced composite material is a carbon fiber reinforced plastic.

15. The cutting method according to claim 2, wherein the cutting method comprises contacting in advance the cut-assisting lubricant with a portion of the workpiece material to serve as a starting point for forming the through-groove.

16. The cutting method according to claim 2, wherein the cutting method comprises contacting in advance the cut-assisting lubricant with the whole surface of a region of the workpiece material where the through-groove is to be formed.

17. The cutting method according to claim 2, wherein the cutting tool is a router bit.

18. The cutting method according to claim 2, wherein the cut-assisting lubricant is in the form of a sheet having a thickness of 0.1 mm or larger.

19. The cutting method according to claim 1 further comprising contacting the cutting tool with the cut-assisting lubricant before cutting the workpiece material with the cutting tool.

20. The cutting method according to claim 1, wherein the fiber reinforced composite material is a glass fiber reinforced plastic and/or an aramid fiber reinforced plastic.

* * * * *

UNITED STATES PATENT AND TRADEMARK OFFICE
CERTIFICATE OF CORRECTION

PATENT NO. : 10,518,341 B2
APPLICATION NO. : 15/754418
DATED : December 31, 2019
INVENTOR(S) : Yousuke Matsuyama et al.

It is certified that error appears in the above-identified patent and that said Letters Patent is hereby corrected as shown below:

On the Title Page

Column 1, at item (30), Foreign Application Priority Data:
"(30) Foreign Application Priority Data
Jun. 15, 2016 (JP) .................. 2016-118726"

Should read:
--(30) Foreign Application Priority Data
Nov. 26, 2015 (JP) .................. 2015-230819
Jun. 15, 2016 (JP) .................. 2016-118726--

Signed and Sealed this
Ninth Day of June, 2020

Andrei Iancu
*Director of the United States Patent and Trademark Office*